US012780083B2

(12) United States Patent
Liu et al.

(10) Patent No.: US 12,780,083 B2
(45) Date of Patent: Nov. 3, 2026

(54) METHOD FOR CONTROLLING LASER HEADLIGHT OF VEHICLE, CONTROL APPARATUS, AND VEHICLE

(71) Applicant: YINWANG INTELLIGENT TECHNOLOGIES CO., LTD., Shenzhen (CN)

(72) Inventors: Nan Liu, Shenzhen (CN); Tao Ma, Beijing (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 297 days.

(21) Appl. No.: 18/408,815

(22) Filed: Jan. 10, 2024

(65) Prior Publication Data

US 2025/0018857 A1 Jan. 16, 2025

Related U.S. Application Data

(63) Continuation of application No. PCT/CN2022/104230, filed on Jul. 6, 2022.

(30) Foreign Application Priority Data

Jul. 12, 2021 (CN) ......................... 202110784651.4

(51) Int. Cl.
*B60Q 1/14* (2006.01)
*B60R 21/0134* (2006.01)
*F21S 45/70* (2018.01)

(52) U.S. Cl.
CPC .......... *B60Q 1/143* (2013.01); *B60R 21/0134* (2013.01); *B60Q 2300/114* (2013.01);
(Continued)

(58) Field of Classification Search
CPC ............. G08G 1/166; G08G 1/096775; G08G 1/096725; G08G 1/164; G08G 1/096783;
(Continued)

(56) References Cited

U.S. PATENT DOCUMENTS 9,731,645 B1 * 8/2017 Taleb-Bendiab ....... B60Q 1/085
2015/0023032 A1 * 1/2015 Kang .................... F21S 41/285 362/466
2019/0054851 A1 * 2/2019 Kim ........................ F21S 41/16

FOREIGN PATENT DOCUMENTS

EP 3138732 A1 * 3/2017 ............ F21S 41/176
EP 3466755 A2 4/2019

(Continued)

OTHER PUBLICATIONS

China National Standard, "Safety of Laser Products Part 1:Equipment Classification and Requirements," GB 7247.1-2012, Dec. 31, 2012, 5 pages (with English Translation).

(Continued)

*Primary Examiner* — Wei (Victor) Y Chan
(74) *Attorney, Agent, or Firm* — Fish & Richardson P.C

(57) ABSTRACT

The present disclosure relates to apparatuses and methods for controlling a laser headlight of a vehicle. One example method includes obtaining first reference information, determining, based on the first reference information, that the vehicle has a collision risk or that a collision occurs to the vehicle, and generating first indication information that is used to turn off the laser headlight of the vehicle. The first reference information includes at least one of first map information, first information sensed by a roadside device, second information sensed by a sensing device on the vehicle, or first control information in the vehicle. When it is determined that the vehicle has a collision risk or that a collision occurs to the vehicle, the first indication information that is used to turn off the laser headlight of the vehicle is generated, so as to turn off the laser headlight.

20 Claims, 13 Drawing Sheets

(52) U.S. Cl.
CPC .... *B60Q 2300/312* (2013.01); *B60Q 2300/32* (2013.01); *B60Q 2300/45* (2013.01); *F21S 45/70* (2018.01)

(58) Field of Classification Search
CPC ........ G08G 1/096741; B60Q 2300/114; B60Q 2300/312; B60Q 2300/32; B60Q 2300/45; B60Q 1/04; B60Q 1/52
See application file for complete search history.

(56) References Cited

FOREIGN PATENT DOCUMENTS

| | | | | | |
|---|---|---|---|---|---|
| EP | 2797772 | B1 | * | 12/2020 | .............. F21S 45/70 |
| WO | 2012124607 | A1 | | 9/2012 | |

OTHER PUBLICATIONS

International Search Report and Written Opinion in International Appln. No. PCT/CN2022/104230, mailed on Sep. 29, 2022, 15 pages (with English Translation).
Extended European Search Report in European Appln. No. 22841252.4, mailed on Oct. 21, 2024, 9 pages.

* cited by examiner

METHOD FOR CONTROLLING LASER HEADLIGHT OF VEHICLE, CONTROL APPARATUS, AND VEHICLE

CROSS-REFERENCE TO RELATED APPLICATIONS

This application is a continuation of International Application No. PCT/CN2022/104230, filed on Jul. 6, 2022, which claims priority to Chinese Patent Application No. 202110784651.4, filed on Jul. 12, 2021. The disclosures of the aforementioned applications are hereby incorporated by reference in their entireties.

TECHNICAL FIELD

This application relates to the field of laser headlight technologies, and in particular, to a method for controlling a laser headlight of a vehicle, a control apparatus, and a vehicle.

BACKGROUND

A laser light source features high energy density and good collimation, and can be used for long-distance illumination. The laser light source provides a relatively good front field of view for a driver when the driver drives at night, especially in an environment that lacks roadside lighting, such as an expressway or a provincial highway. Therefore, road driving safety is improved. A forward radiation distance of the laser light source is about twice that of a light emitting diode (LED), and can reach about 600 meters. In addition, the laser light source has high energy efficiency. However, due to a collimation characteristic of laser light, a radiation width of the laser light is insufficient. Therefore, the laser light is usually used in combination with an LED lamp. For example, a vehicle may use a combination of an LED low beam, an LED high beam, and a laser headlight, to achieve short-distance, medium-distance, and long-distance illumination. A main principle of the laser headlight is: the laser headlight uses a laser diode as an excitation light source to excite a light phosphor material, and converts the excitation light source into diffused white light. A spectrum of the white light emitted by the laser headlight is the same as a spectrum of an LED light source.

Currently, power of a semiconductor laser used by the laser light source is generally greater than 1 watt (W), to obtain a high luminous flux. According to the GB 7247.1 Safety of Laser Products, laser sources whose power is greater than 1 W are classified into four types of lasers. Laser light emitted by such a laser may cause permanent injuries to human eyes even if the laser light is directly exposed to the human eyes for a short period of time. When a vehicle collision occurs, a portion of laser light passes through a crack and directly leaks out of the laser headlight. As shown in FIG. 1, the leaked laser light causes injuries to human eyes.

In conclusion, how to improve use safety of the laser headlight is a technical problem that needs to be urgently resolved currently.

SUMMARY

This application provides a method for controlling a laser headlight of a vehicle, a control apparatus, and a vehicle, to improve use safety of the laser headlight.

According to a first aspect, this application provides a method for controlling a laser headlight of a vehicle. The method includes: obtaining first reference information; determining, based on the first reference information, that the vehicle has a collision risk or that a collision occurs to the vehicle; and generating first indication information that is used to turn off the laser headlight of the vehicle.

The method may be performed by the vehicle, for example, may be performed by an in-vehicle controller in the vehicle. For example, the in-vehicle controller may be an independent laser headlight controller, a domain controller in the vehicle, or an electronic control unit (ECU) in the vehicle. Alternatively, the method may be performed by a roadside device, or may be performed by a module (such as a chip) in the roadside device. Alternatively, the method may be performed by a server, or may be performed by a module (such as a chip) in the server.

In this solution, when it is determined that the vehicle has a collision risk or that a collision occurs to the vehicle, the first indication information that is used to turn off the laser headlight of the vehicle may be generated based on the obtained first reference information, so as to turn off the laser headlight when the vehicle has the collision risk or the collision occurs to the vehicle. This helps prevent laser light from leaking out of a laser light source due to damage caused to the laser headlight by a vehicle collision. Therefore, use safety of the laser headlight can be improved.

In a possible implementation, after the first indication information that is used to turn off the laser headlight of the vehicle is generated when it is determined, based on the first reference information, that the vehicle has the collision risk, the method further includes: obtaining second reference information; determining, based on the second reference information, that the collision risk is eliminated; and generating second indication information that is used to turn on the laser headlight. The second reference information includes at least one of second map information, third information sensed by a roadside device, fourth information sensed by a sensing device on the vehicle, and second control information in the vehicle.

After it is determined that the collision risk of the vehicle is eliminated, the second indication information that is used to turn on the laser headlight is generated, so that the laser headlight can be automatically turned on. This facilitates use of the laser headlight while use safety of the laser headlight is ensured.

Based on different first parameter information, the following describes, in different cases, manners of determining that the vehicle has a collision risk or that a collision occurs to the vehicle.

Case 1: The first reference information includes first map information.

In a possible implementation, the first map information includes information about a first driving environment in front of the vehicle during driving. The information about the first driving environment indicates at least one of the following: a case in which an obstacle exists on a road segment in front of the vehicle, a case in which a pothole exists on the road segment in front of the vehicle, a case in which a construction area exists on the road segment in front of the vehicle, a case in which a wildlife presence area exists on the road segment in front of the vehicle, first risk information of the road segment in front of the vehicle, a case in which the road segment in front of the vehicle is a gathering area of vulnerable road users, and a first weather condition of the road segment in front of the vehicle. Further, optionally, a risk level corresponding to the first risk information is greater than a risk threshold. Further, optionally, the first weather condition is bad weather.

Based on Case 1, the following describes a possible manner of determining that the vehicle has the collision risk.

In a possible implementation, it is determined, based on path planning of the vehicle, that the information about the first driving environment is information about a road segment to be passed by the vehicle; and it is determined, based on the information about the first driving environment, that the vehicle has the collision risk.

Before the collision occurs to the vehicle, it may be determined, based on the information that is about the first driving environment and that is included in the first map information, that the vehicle has the collision risk. Therefore, the laser headlight can be turned off before the collision occurs to the vehicle, and use safety of the laser headlight can be improved.

After the collision risk of the vehicle is eliminated, the laser headlight can be turned on again. In a possible implementation, the second map information is obtained, where the second map information includes information about a third driving environment in front of the vehicle during driving. The information about the third driving environment indicates: a case in which no obstacle exists on a road segment in front of the vehicle, a case in which no pothole exists on the road segment in front of the vehicle, a case in which no construction area exists on the road segment in front of the vehicle, a case in which no wildlife presence area exists on the road segment in front of the vehicle, second risk information of the road segment in front of the vehicle, a case in which the road segment in front of the vehicle is not a gathering area of vulnerable road users, and a second weather condition of the road segment in front of the vehicle. Further, optionally, a risk level corresponding to the second risk information is not greater than a risk threshold. Further, optionally, the second weather condition is not bad weather.

Further, optionally, it is determined, based on the path planning of the vehicle, that the information about the third driving environment is information about the road segment to be passed by the vehicle; and it is determined, based on the information about the third driving environment, that the collision risk is eliminated.

It is determined, based on the information that is about the third driving environment and that is included in the obtained second map information, that the collision risk of the vehicle is eliminated, and the laser headlight can be turned on again. This facilitates use of the laser headlight while use safety of the laser headlight is ensured.

Case 2: The first parameter information includes first information sensed by the roadside device.

In a possible implementation, the first information sensed by the roadside device includes information about a second driving environment in front of the vehicle during driving. The information about the second driving environment indicates at least one of the following: a case in which an obstacle exists on a road segment in front of the vehicle, a case in which a pothole exists on the road segment in front of the vehicle, a case in which a construction area exists on the road segment in front of the vehicle, a case in which a wildlife presence area exists on the road segment in front of the vehicle, first risk information of the road segment in front of the vehicle, a case in which the road segment in front of the vehicle is a gathering area of vulnerable road users, and a first weather condition of the road segment in front of the vehicle.

Based on Case 2, the following describes a possible manner of determining that the vehicle has the collision risk.

In a possible implementation, it is determined, based on path planning of the vehicle, that the information about the second driving environment is information about a road segment to be passed by the vehicle; and it is determined, based on the information about the second driving environment, that the vehicle has the collision risk.

In Manner 2, before the collision occurs to the vehicle, it may be determined, based on the information that is about the second driving environment and that is included in the first information sensed by the roadside device, that the vehicle has the collision risk. Therefore, the laser headlight can be turned off before the collision occurs to the vehicle, and use safety of the laser headlight can be improved.

After the collision risk of the vehicle is eliminated, the laser headlight can be turned on again. In a possible implementation, the third information sensed by the roadside device is obtained, where the third information sensed by the roadside device includes information about a fourth driving environment in front of the vehicle during driving. The information about the fourth driving environment indicates: a case in which no obstacle exists on a road segment in front of the vehicle, a case in which no pothole exists on the road segment in front of the vehicle, a case in which no construction area exists on the road segment in front of the vehicle, a case in which no wildlife presence area exists on the road segment in front of the vehicle, second risk information of the road segment in front of the vehicle, a case in which the road segment in front of the vehicle is not a gathering area of vulnerable road users, and a second weather condition of the road segment in front of the vehicle.

Further, optionally, it is determined, based on the path planning of the vehicle, that the information about the fourth driving environment is information about the road segment to be passed by the vehicle; and it is determined, based on the information about the fourth driving environment, that the collision risk is eliminated.

It is determined, based on the information that is about the fourth driving environment and that is included in the third information sensed by the roadside device, that the collision risk of the vehicle is eliminated, and the laser headlight can be turned on again. This facilitates use of the laser headlight while use safety of the laser headlight is ensured.

Case 3: The first reference information includes second information sensed by the sensing device on the vehicle.

Case 3.1: The second information sensed by the sensing device on the vehicle includes a first time-to-collision (TTC).

In a possible implementation, the second information sensed by the sensing device on the vehicle includes the first TTC, and it is determined, based on a condition that the first TTC meets a first preset condition, that the vehicle has the collision risk.

Further, optionally, it is determined, based on a condition that the first TTC is less than a first preset value, that the vehicle has the collision risk.

Before the collision occurs to the vehicle, it may be determined, based on the first TTC sensed by the sensing device on the vehicle, that the vehicle has the collision risk. Therefore, the laser headlight can be turned off before the collision occurs to the vehicle, and use safety of the laser headlight can be improved.

After the collision risk of the vehicle is eliminated, the laser headlight can be turned on again. In a possible implementation, the third information sensed by the sensing device on the vehicle is obtained, where the third information sensed by the sensing device on the vehicle includes a second TTC; and it is determined, based on a condition that the second TTC does not meet a first preset condition, that the collision risk is eliminated.

Further, optionally, it is determined, based on a condition that the second TTC is greater than or equal to a first preset value, that the collision risk is eliminated.

It is determined, based on the second TTC sensed by the sensing device on the vehicle, that the collision risk of the vehicle is eliminated, and the laser headlight can be turned on again. This facilitates use of the laser headlight while use safety of the laser headlight is ensured.

Case 3.2: The second information sensed by the sensing device on the vehicle includes a first kinetics parameter.

In a possible implementation, the second information sensed by the sensing device on the vehicle includes the first kinetics parameter, and it is determined, based on a condition that the first kinetics parameter meets a second preset condition, that the vehicle has the collision risk.

It is determined that the first kinetics parameter sensed by the sensing device on the vehicle meets the second preset condition. In this way, before the collision occurs to the vehicle, it can be determined that the vehicle has the collision risk. Therefore, the laser headlight can be turned off before the collision occurs to the vehicle, and use safety of the laser headlight can be improved.

In a possible implementation, the first kinetics parameter includes but is not limited to a first transverse acceleration, a first longitudinal acceleration, a change rate of the first transverse acceleration, or a change rate of the first longitudinal acceleration.

After the collision risk of the vehicle is eliminated, the laser headlight can be turned on again. In a possible implementation, the fourth information sensed by the sensing device on the vehicle is obtained, where the fourth information sensed by the sensing device on the vehicle includes a second kinetics parameter; and it is determined, based on a condition that the second kinetics parameter does not meet a second preset condition, that the collision risk of the vehicle is eliminated.

In a possible implementation, the second kinetics parameter of the vehicle includes but is not limited to a second transverse acceleration, a second longitudinal acceleration, a change rate of the second transverse acceleration, or a change rate of the second longitudinal acceleration.

Case 3.3: The second information sensed by the sensing device on the vehicle includes collision indication information sensed by a collision sensor.

In a possible implementation, the second information sensed by the sensing device on the vehicle includes the collision indication information sensed by the collision sensor, and it is determined, based on the collision indication information, that the collision occurs to the vehicle.

Based on the collision indication information sensed by the sensing device on the vehicle, the laser headlight may be turned off after the collision occurs to the vehicle. Therefore, use safety of the laser headlight can be improved.

Case 4: The first reference information includes first control information in the vehicle.

Case 4.1: The first control information in the vehicle includes an active signal of a safety-type advanced driver assistance system (ADAS).

In a possible implementation, the first control information in the vehicle includes the active signal of the safety-type ADAS, and it is determined, based on the active signal of the safety-type ADAS, that the vehicle has the collision risk.

Further, optionally, the active signal of the safety-type ADAS includes but is not limited to an active signal of an automatic emergency braking (AEB) system, an active signal of an emergency steering support (ESS) system, an active signal of an automatic emergency steering (AES) system, or an active signal of a front cross traffic alert (FCTA) system.

After the collision risk of the vehicle is eliminated, the laser headlight can be turned on again. In a possible implementation, the second control information in the vehicle includes an inactive signal of a safety-type ADAS, and it is determined, based on the inactive signal of the safety-type ADAS, that the collision risk is eliminated.

Case 4.2: The first control information in the vehicle includes information that is generated by an airbag control unit and that is used to inflate an airbag.

In a possible implementation, the first control information in the vehicle includes the information used to inflate the airbag, and it is determined, based on the information used to inflate the airbag, that the collision occurs to the vehicle.

Based on the information that is generated by the airbag control unit on the vehicle and that is used to inflate the airbag, the laser headlight may be turned off after the collision occurs to the vehicle. Therefore, use safety of the laser headlight can be improved.

In a possible implementation, when the foregoing method is performed by the roadside device or the server, the method further includes: sending the first indication information to the vehicle.

The method is performed by the roadside device or the server, and the first indication information is sent to the vehicle. The vehicle receives the first indication information from the server or the roadside device, and controls, based on the first indication information, to turn off the laser headlight. This helps simplify processing logic of the vehicle.

In a possible implementation, when the method is performed by the vehicle, the method further includes: turning off the laser headlight based on the first indication information.

According to a second aspect, this application provides a control apparatus. The control apparatus is configured to perform the method according to the first aspect or any possible implementation of the first aspect. The control apparatus includes corresponding functional modules that are separately configured to perform steps in the foregoing method. The function may be implemented by hardware, or may be implemented by hardware executing corresponding software. The hardware or software includes one or more modules corresponding to the foregoing functions.

In a possible implementation, the control apparatus may include a processing module and an obtaining module. The obtaining module is configured to obtain first reference information, where the first reference information includes at least one of first map information, first information sensed by a roadside device, second information sensed by a sensing device on a vehicle, and first control information in the vehicle. The processing module is configured to: determine, based on the first reference information, that the vehicle has a collision risk or that a collision occurs to the vehicle; and generate first indication information that is used to turn off a laser headlight of the vehicle.

In a possible implementation, the obtaining module is further configured to obtain second reference information, where the second reference information includes at least one of second map information, third information sensed by the roadside device, fourth information sensed by the sensing device on the vehicle, and second control information in the vehicle. The processing module is further configured to: determine, based on the second reference information, that the collision risk is eliminated; and generate second indication information that is used to turn on the laser headlight.

In a possible implementation, the first map information includes information about a first driving environment in front of the vehicle during driving, and/or the information sensed by the roadside device includes information about a second driving environment in front of the vehicle during driving. The processing module is specifically configured to: determine, based on path planning of the vehicle, that the information about the first driving environment is information about a road segment to be passed by the vehicle, and determine, based on the information about the first driving environment, that the vehicle has the collision risk; and determine, based on the path planning of the vehicle, that the information about the second driving environment is information about the road segment to be passed by the vehicle, and determine, based on the information about the second driving environment, that the vehicle has the collision risk. The information about the first driving environment and the information about the second driving environment each indicate at least one of the following: a case in which an obstacle exists on the road segment in front of the vehicle, a case in which a pothole exists on the road segment in front of the vehicle, a case in which a construction area exists on the road segment in front of the vehicle, a case in which a wildlife presence area exists on the road segment in front of the vehicle, first risk information of the road segment in front of the vehicle, a case in which the road segment in front of the vehicle is a gathering area of vulnerable road users, and a first weather condition of the road segment in front of the vehicle.

In a possible implementation, the second information sensed by the sensing device on the vehicle includes information about a first time-to-collision TTC. The processing module is specifically configured to determine, based on a condition that the first TTC meets a first preset condition, that the vehicle has the collision risk.

In a possible implementation, the second information sensed by the sensing device on the vehicle includes a first kinetics parameter. The processing module is specifically configured to determine, based on a condition that the first kinetics parameter meets a second preset condition, that the vehicle has the collision risk.

In a possible implementation, the first control information in the vehicle includes an active signal of a safety-type ADAS. The processing module is specifically configured to determine, based on the active signal of the safety-type ADAS, that the vehicle has the collision risk.

In a possible implementation, the second information sensed by the sensing device on the vehicle includes collision indication information sensed by a collision sensor, and/or the first control information in the vehicle includes information that is generated by an airbag control unit and that is used to inflate an airbag. The processing module is specifically configured to determine, based on the collision indication information and/or the information used to inflate the airbag, that the collision occurs to the vehicle.

In a possible implementation, the control apparatus is the roadside device or a server, or the control apparatus belongs to the roadside device or a server. The control apparatus further includes a transceiver module, configured to send the first indication information to the vehicle.

In a possible implementation, the control apparatus is the vehicle, or the control apparatus belongs to the vehicle. The processing module is further configured to turn off the laser headlight based on the first indication information.

According to a third aspect, this application provides a control apparatus. The control apparatus is configured to perform the method according to the first aspect or any possible implementation of the first aspect. The control apparatus includes corresponding functional modules that are separately configured to perform steps in the foregoing method. The function may be implemented by hardware, or may be implemented by hardware executing corresponding software. The hardware or software includes one or more modules corresponding to the foregoing functions.

In a possible implementation, the control apparatus may include a processor and an interface circuit. The processor may be configured to support the control apparatus in performing the method according to the first aspect or any possible implementation of the first aspect. The interface circuit is configured to support communication between the control apparatus and another device or the like. The interface circuit may be a transceiver. The transceiver may be an independent receiver, an independent transmitter, a transceiver integrating a transceiver function, or a communication interface. Optionally, the control apparatus may further include a memory. The memory may be coupled to the processor, and the memory stores program instructions and data that are used for the control apparatus.

The processor is configured to obtain first reference information through the interface circuit, where the first reference information includes at least one of first map information, first information sensed by a roadside device, second information sensed by a sensing device on a vehicle, and first control information in the vehicle. The processor is further configured to: determine, based on the first reference information, that the vehicle has a collision risk or that a collision occurs to the vehicle; and generate first indication information that is used to turn off a laser headlight of the vehicle.

In a possible implementation, the processor is further configured to obtain second reference information through the interface circuit, where the second reference information includes at least one of second map information, third information sensed by the roadside device, fourth information sensed by the sensing device on the vehicle, and second control information in the vehicle. The processor is further configured to: determine, based on the second reference information, that the collision risk is eliminated; and generate second indication information that is used to turn on the laser headlight.

In a possible implementation, the first map information includes information about a first driving environment in front of the vehicle during driving, and/or the information sensed by the roadside device includes information about a second driving environment in front of the vehicle during driving. The processor is specifically configured to: determine, based on path planning of the vehicle, that the information about the first driving environment is information about a road segment to be passed by the vehicle, and determine, based on the information about the first driving environment, that the vehicle has the collision risk; and determine, based on the path planning of the vehicle, that the information about the second driving environment is information about the road segment to be passed by the vehicle, and determine, based on the information about the second driving environment, that the vehicle has the collision risk. The information about the first driving environment and the information about the second driving environment each indicate at least one of the following: a case in which an obstacle exists on the road segment in front of the vehicle, a case in which a pothole exists on the road segment in front of the vehicle, a case in which a construction area exists on the road segment in front of the vehicle, a case in which a wildlife presence area exists on the road segment in front of the vehicle, first risk information of the road segment in front of the vehicle, a case in which the road segment in front of the vehicle is a gathering area of vulnerable road users, and a first weather condition of the road segment in front of the vehicle.

In a possible implementation, the second information sensed by the sensing device on the vehicle includes information about a first time-to-collision TTC. The processor is specifically configured to determine, based on a condition that the first TTC meets a first preset condition, that the vehicle has the collision risk.

In a possible implementation, the second information sensed by the sensing device on the vehicle includes a first kinetics parameter. The processor is specifically configured to determine, based on a condition that the first kinetics parameter meets a second preset condition, that the vehicle has the collision risk.

In a possible implementation, the first control information in the vehicle includes an active signal of a safety-type ADAS. The processor is specifically configured to determine, based on the active signal of the safety-type ADAS, that the vehicle has the collision risk.

In a possible implementation, the second information sensed by the sensing device on the vehicle includes collision indication information sensed by a collision sensor, and/or the first control information in the vehicle includes information that is generated by an airbag control unit and that is used to inflate an airbag. The processor is specifically configured to determine, based on the collision indication information and/or the information used to inflate the airbag, that the collision occurs to the vehicle.

In a possible implementation, the control apparatus is the roadside device or a server, or the control apparatus belongs to the roadside device or a server. The control apparatus further includes a transceiver module, configured to send the first indication information to the vehicle.

In a possible implementation, the control apparatus is the vehicle, or the control apparatus belongs to the vehicle. The processor is further configured to turn off the laser headlight based on the first indication information.

According to a fourth aspect, this application provides a vehicle, where the vehicle includes a control apparatus according to the second aspect or any possible implementation of the second aspect, or includes a control apparatus according to the third aspect or any possible implementation of the third aspect.

According to a fifth aspect, a chip including a processor is provided. The processor is coupled to a memory and is configured to execute a computer program or instructions stored in the memory, so that the chip performs the method according to the first aspect or any possible implementation of the first aspect.

According to a sixth aspect, this application provides a computer-readable storage medium. The computer-readable storage medium stores a computer program or instructions. When the computer program is executed by a control apparatus or the instructions are executed by a control apparatus, the control apparatus is enabled to perform the method according to the first aspect or any possible implementation of the first aspect.

According to a seventh aspect, this application provides a computer program product. The computer program product includes a computer program or instructions. When the computer program is executed by a control apparatus or the instructions are executed by a control apparatus, the control apparatus is enabled to perform the method according to the first aspect or any possible implementation of the first aspect.

DESCRIPTION OF EMBODIMENTS

Figure 1:
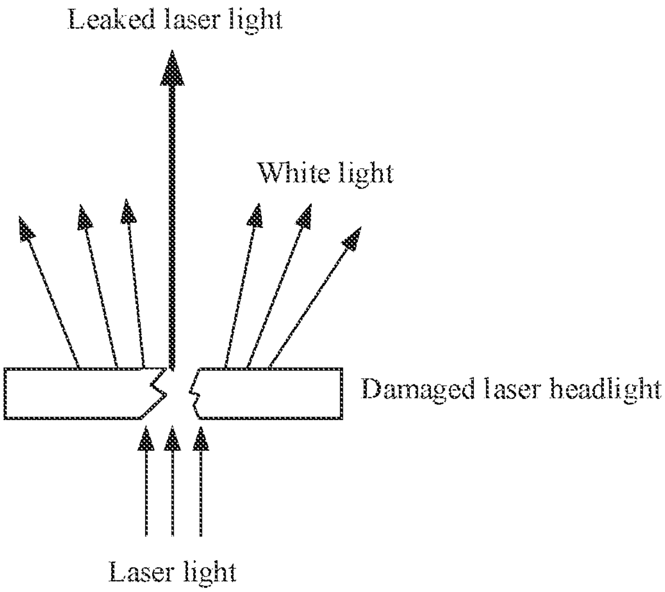
FIG. 1 is a schematic diagram of a principle based on which laser light leaks out of a laser headlight.

The following describes in detail embodiments of this application with reference to accompanying drawings.

The following describes some terms in this application. It should be noted that these explanations are intended to help a person skilled in the art have a better understanding, but do not constitute a limitation on the protection scope claimed in this application.

1. Time-to-Collision (TTC)

The TTC is an amount of time obtained by dividing a distance between a vehicle and a target (such as a vehicle in front or an obstacle on a road segment in front of the vehicle) by an instantaneous relative speed between the vehicle and the target. It should be understood that a smaller TTC indicates a higher collision risk of the vehicle.

2. Longitudinal Deceleration of a Vehicle

The longitudinal deceleration of the vehicle is a deceleration along an axis of the vehicle. It should be understood that a larger longitudinal deceleration of the vehicle indicates stronger longitudinal control performed on the vehicle and a higher collision risk of the vehicle.

3. Transverse Acceleration of a Vehicle

The transverse acceleration of the vehicle is an acceleration in a direction perpendicular to a driving direction of the vehicle, which is an acceleration caused by a centrifugal force generated when the vehicle turns. In other words, the transverse acceleration indicates a trend of the vehicle "being thrown into the air". Theoretically, a larger transverse acceleration indicates that the vehicle is more likely to be "thrown" away from a driving path. For example, the vehicle is controlled through emergency steering. It should be understood that a larger transverse acceleration of the vehicle indicates stronger transverse control performed on the vehicle and a higher collision risk of the vehicle.

4. Change Rate of a Longitudinal Deceleration of a Vehicle

The change rate of the longitudinal deceleration of the vehicle indicates a variation of the longitudinal deceleration of the vehicle per unit time.

5. Change Rate of a Transverse Acceleration of a Vehicle

The change rate of the transverse acceleration of the vehicle indicates a variation of the transverse acceleration of the vehicle per unit time.

It should be noted that the longitudinal deceleration of the vehicle, the transverse acceleration of the vehicle, the change rate of the longitudinal deceleration of the vehicle, and the change rate of the transverse acceleration of the vehicle may all be used to represent stability of the vehicle, and are parameters of an electronic stability control (ESC) system of the vehicle. In other words, the ESC system includes an acceleration sensor, and the acceleration sensor may obtain the transverse acceleration and the longitudinal deceleration of the vehicle in real time.

6. Internet of Vehicles (Vehicle to Everything, V2X)

The V2X is a key technology of an intelligent transportation system, and is considered as one of most promising fields with clearest market requirements in an IoT system. The V2X features a wide application scope, high industrial potential, and significant social benefits. The V2X plays an important role in promoting innovative development of vehicle and information communication industries, establishing new models and new forms of vehicle and transportation services, and driving innovation and application of technologies such as unmanned driving, assisted driving, intelligent driving, connected driving, intelligent connected driving, automated driving, and vehicle sharing. In addition, the V2X plays an important role in improving traffic efficiency and safety. The internet of vehicles generally refers to a communication network providing vehicle information by using a sensor, a vehicle-mounted terminal device, or the like that is loaded on a vehicle, to implement vehicle-to-vehicle (V2V), vehicle-to-infrastructure (V2I), vehicle-to-network (V2N), and vehicle-to-pedestrian (V2P) communication.

Generally, in a V2X scenario, a communication link for direct communication between devices may be referred to as a sidelink or a sidelink (SL).

7. ADAS

ADAS systems mainly include a safety-type ADAS and a comfort-type ADAS. The safety-type ADAS is mainly used to perform vehicle control and intervention or warn a driver of a collision risk. A signal sent after the safety-type ADAS is activated may be referred to as an active signal of the safety-type ADAS. The active signal may be sent to a related in-vehicle controller through an in-vehicle network, such as a controller area network (CAN) bus (refer to FIG. 2*a* below). A signal sent when the safety-type ADAS is in an inactive state (such as an OFF state) may be referred to as an inactive signal of the safety-type ADAS. The safety-type ADAS includes but is not limited to an AEB system, an ESS system, an AES system, an FCTA system, or the like.

Comfort-type ADASs are mainly used to control the vehicle to travel in the center, for example, an adaptive cruise control (ACC) system and a lane centering control (LCC) system.

Based on the foregoing content, the following describes an applicable architecture of this application and a possible application scenario.

Figure 2A:
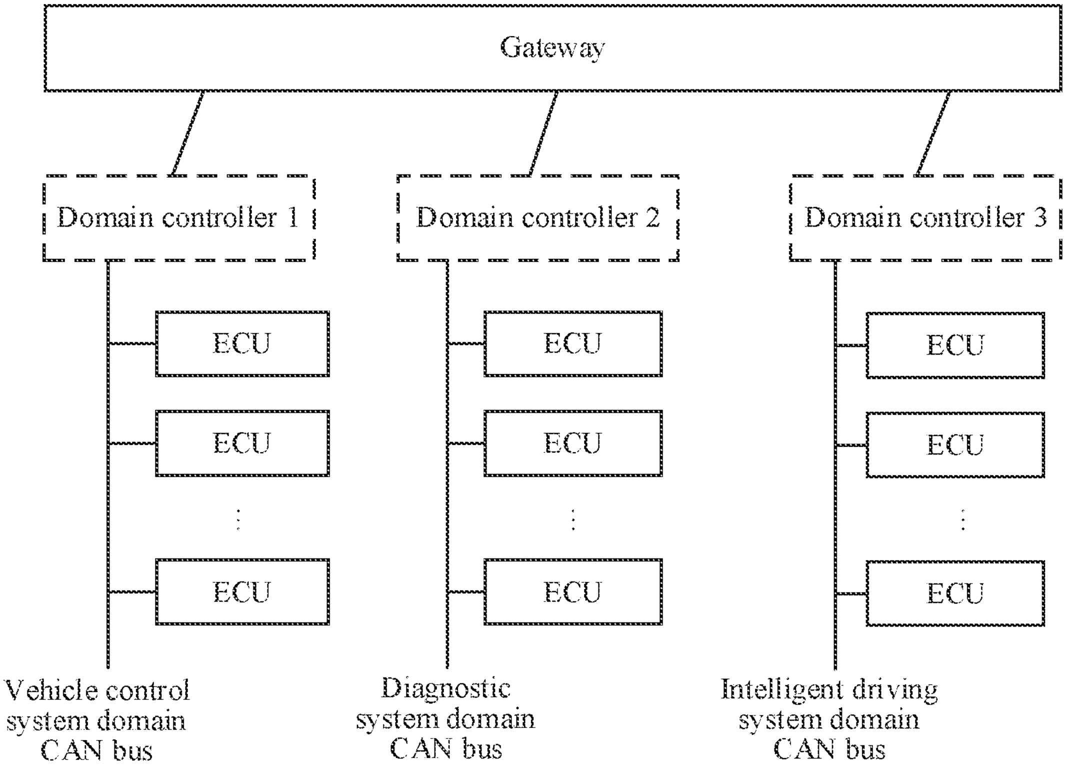
FIG. 2*a* is a schematic diagram depicting an internal architecture of a vehicle according to this application.

Refer to FIG. 2*a*, which is a schematic diagram depicting an applicable internal architecture of a vehicle according to this application. For example, the vehicle uses an electronic/electrical (E/E) system. The E/E system may include a gateway, a domain controller, an electronic control unit (ECU), and at least one controller area network (CAN) bus. The ECU may also be referred to as an "in-vehicle computer", a "vehicle-mounted computer", a "vehicle-specific microcontroller", a "lower computer", or the like. The ECU is one of core elements of the vehicle. The ECU may be a structure integrated with a microprocessor, a memory, an input/output interface, an analog-to-digital converter, a driver, and the like. The E/E system may be divided into a plurality of different domains based on functions. Each domain may include at least one domain controller, and each domain controller is configured to manage one or more ECUs in the domain. ECUs in a domain may be connected through a CAN bus. In other words, the ECUs in the domain may communicate with each other by using a CAN protocol. In FIG. 2*a*, a domain controller 1 manages a plurality of ECUs, in a domain, connected to a CAN bus of a vehicle control system; a domain controller 2 is configured to manage a plurality of ECUs, in a domain, connected to a CAN bus of a diagnostic system; and a domain controller 3 is configured to manage a plurality of ECUs, in a domain, connected to a CAN bus of an intelligent driving system. Each domain controller belongs to a gateway. The gateway is a core part of a vehicle architecture. As a hub of data exchange of a vehicle network, the gateway can route data of a network, such as a CAN, to different networks to manage domain controllers and ECUs in domains. For example, the gateway is configured to isolate an ECU outside the E/E system from the E/E system, and may implement protocol conversion between ECUs in the E/E system.

It should be noted that the E/E architecture shown in FIG. 2*a* is merely a schematic diagram, and is not intended to limit this application. For example, a quantity of domains included in the E/E architecture and a quantity of ECUs in a domain may be larger or smaller than those shown in FIG. 2*a*.

Figure 2B:
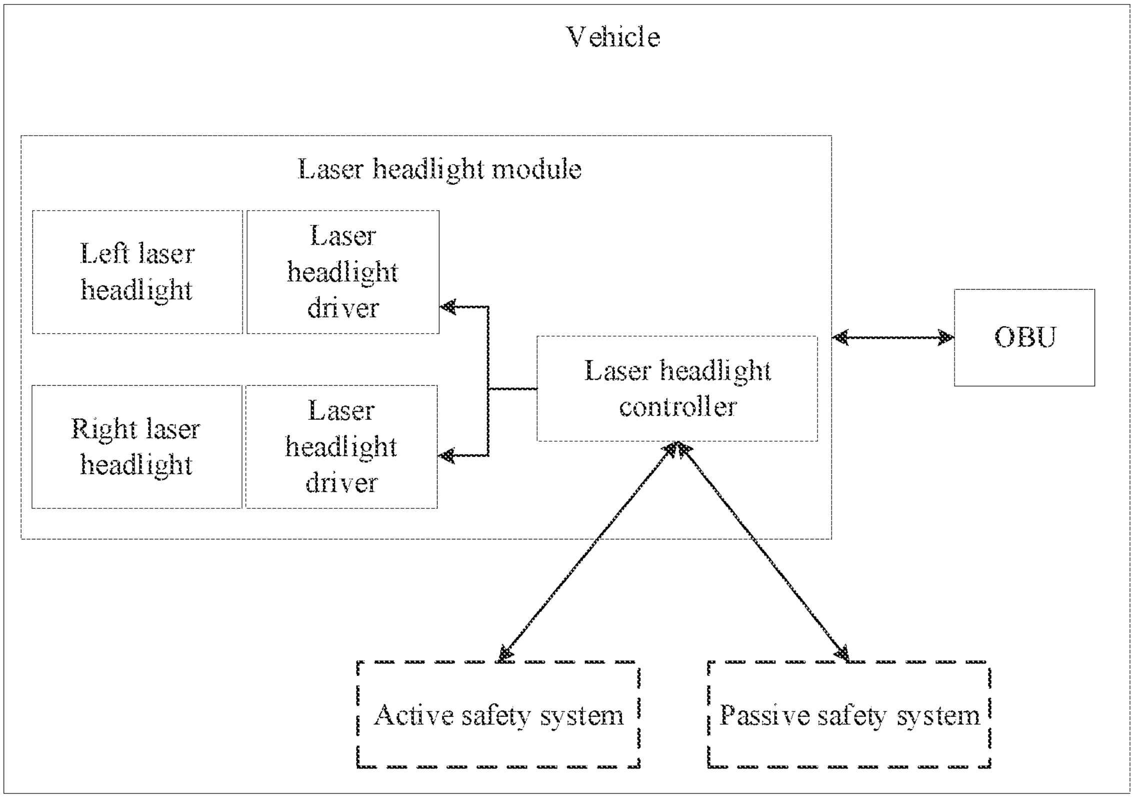
FIG. 2*b* is a schematic diagram depicting another internal architecture of a vehicle according to this application.

Refer to FIG. 2*b*, which is a schematic diagram depicting another applicable internal architecture of a vehicle according to this application. The vehicle may include a laser headlight module and an on-board unit (OBU). The laser headlight module may include a laser headlight controller, a laser headlight, and a laser headlight driver. The laser headlight controller may be configured to control the laser headlight driver, and the laser headlight driver may control the laser headlight to be turned on or off based on an enabling capability of the laser headlight controller. For example, if the laser headlight controller determines that the laser headlight needs to be turned off, the laser headlight controller may send, to the laser headlight driver, an indication for turning off the laser headlight. The laser headlight driver turns off the laser headlight based on the received indication for turning off the laser headlight. For another example, if the laser headlight controller determines that the laser headlight needs to be turned on, the laser headlight controller may send, to the laser headlight driver, an indication for turning on the laser headlight. The laser headlight driver turns on the laser headlight based on the received indication for turning on the laser headlight. For example, the vehicle may have a left laser headlight and a right laser headlight (refer to FIG. 2*c*). The OBU is used for communication between the vehicle and the outside. The OBU is a communication apparatus that uses a dedicated short-range communication (DSRC) technology. For example, the vehicle may send, through the OBU, related information (such as a vehicle type, vehicle status information, vehicle location information, and/or a vehicle ID) of the vehicle to a surrounding vehicle that also has a V2X communication capability or a roadside device that also has a V2X communication capability. Alternatively, the vehicle may receive, through the OBU, information sent by another surrounding vehicle or a roadside device.

In this application, the vehicle may further include an anti-lock braking system (ABS), an electronic stability program (ESP), an automatic emergency braking (AEB) system, an emergency steering support (ESS) system, an automatic emergency steering (AES) system, a front cross traffic alert (FCTA) system, and the like. These systems may be referred to as active safety systems. The active safety systems are safety systems designed to prevent accidents in the vehicle and avoid injuries to a person.

Further, optionally, various sensing devices are disposed around a body of the vehicle (for example, disposed in a front left, front right, left, right, rear left, or rear right of the vehicle). For example, a sensor for collision detection (which may be referred to as a collision sensor) is disposed around the body of the vehicle. The collision sensor is configured to detect a strength signal of a vehicle collision when the collision occurs to the vehicle. Most collision sensors use a structure of an inertia mechanical switch, which is equivalent to a control switch. A working state of the collision sensor depends on an acceleration of the vehicle during a collision. Further, the collision sensor may input a collision signal into an airbag control unit, and the airbag control unit determines, based on the collision signal from the collision sensor, whether to ignite an inflatable element to inflate an airbag. For example, when the airbag control unit determines that a strength of the collision signal reaches a preset collision strength, a gas generating agent is ignited by using an airbag igniter, and a large amount of gas is generated to inflate the airbag. The collision sensor, the airbag, and the like belong to a passive safety system. The passive safety system is a safety system mainly designed to avoid or reduce injuries to a person during a vehicle collision after a specific in-vehicle sensor identifies the vehicle collision. The passive safety system may further include a seat belt, a pedestrian protection system (such as an active protective engine hood), an irreversible restraint apparatus (such as a protective headrest or a pedestrian protection apparatus), and the like.

For another example, a sensor configured to sense information about a driving environment of the vehicle may be further disposed around the body of the vehicle. For example, the sensor may sense whether an obstacle exists in front of the vehicle, a location of the vehicle, a driving track of the vehicle, and the like. The sensor includes but is not limited to a camera, a radar, or the like.

Figure 2C:
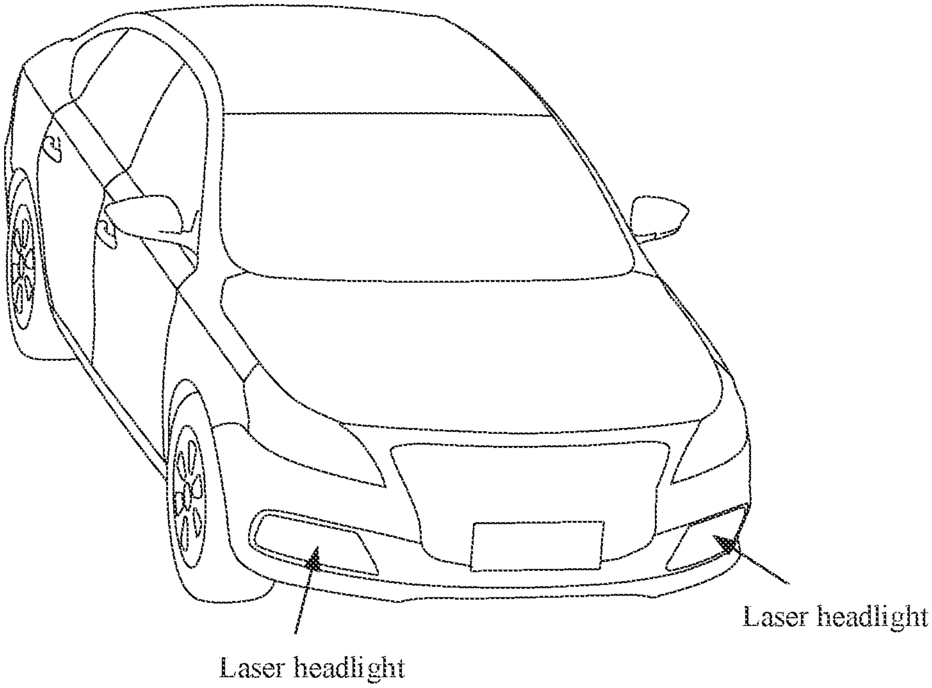
FIG. 2*c* is a schematic diagram depicting locations of laser headlights on a vehicle according to this application.

It should be noted that vehicle architectures shown in FIG. 2*a* to FIG. 2*c* are merely examples, and no limitation is imposed thereto in this application.

Figure 2D:
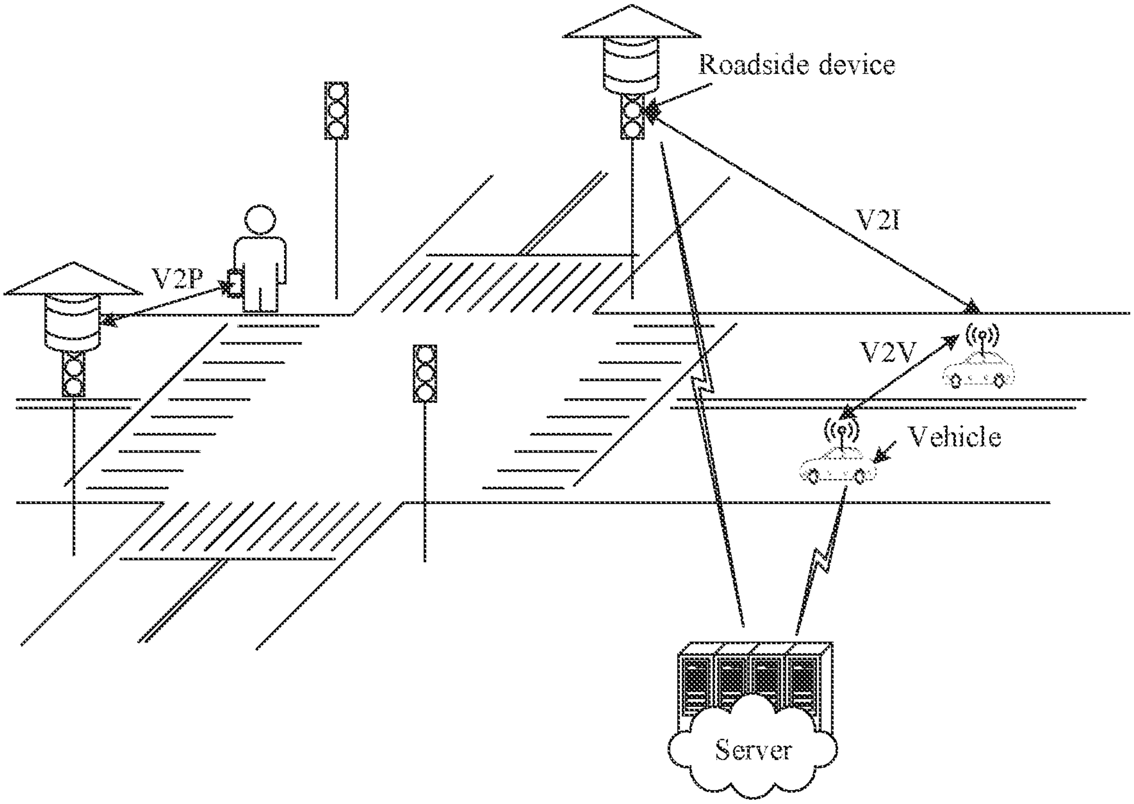
FIG. 2*d* is a schematic diagram depicting an architecture of a communication system according to this application.

Refer to FIG. 2*d*, which is a schematic diagram depicting an architecture of a possible applicable communication system provided in this application. The communication system may include a roadside device (RSU), a server, and a vehicle. The vehicle includes but is not limited to an unmanned vehicle, an intelligent vehicle, an electric vehicle, a digital vehicle, or the like. The vehicle has a remote communication capability. For a possible architecture and function, refer to the foregoing descriptions of FIG. 2*a* and FIG. 2*b*. Details are not described herein. The vehicle and the roadside device may communicate with each other through V2X, the server and the vehicle may communicate with each other in a wireless manner, and the server and the roadside device may communicate with each other in a wireless manner.

The roadside device has a function of sensing information about a surrounding environment. For example, the roadside device can sense a location (such as longitude or latitude) of the vehicle, a driving speed of the vehicle, a driving track of the vehicle, a vehicle identifier (ID) (such as a license plate number), a vehicle type (such as an unmanned vehicle, an intelligent vehicle, an electric vehicle, or a digital vehicle), a vehicle state (such as normal, abnormal, or to-be-rescued), a location of a pedestrian, a location of a non-motor vehicle, a speed of the non-motor vehicle, and the like. The roadside device includes but is not limited to a roadside sensor; and the roadside sensor is, for example, a camera, a radar, or an electronic eye. It should be understood that the roadside device may be installed on a roadside infrastructure; and the roadside infrastructure is, for example, a traffic light or a roadside pole.

The server stores a dynamic high-definition map, and the dynamic high-definition map may include road-level information, lane-level information, and weather information. The lane-level information indicates lane information in a road network environment, for example, information such as a lane curvature, a lane direction, a lane centerline, a lane width, a lane marking, a lane speed limit, lane division, and lane merging. In addition, the lane-level information may include a lane line state (dashed-line, solid-line, single-line, or double-line) between lanes, a lane line color (white or yellow), a road isolation belt, a material of the isolation belt, a road arrow, text content, a location, and the like. It should be understood that the high-definition map usually includes a plurality of layers, and a top-layer image in the plurality of layers may include dynamic information, such as a road congestion status and a weather condition. The server may be a single server, or may be a server cluster that includes a plurality of servers. For example, the server may be a cloud server (or referred to as a cloud, a cloud side, a cloud server, a cloud controller, or an internet of vehicles server). It may also be understood that the cloud server is a general term for a device or component having a data processing capability. For example, the cloud server may be a physical device such as a host or a processor, may be a virtual device such as a virtual machine or a container, or may be a chip, an integrated circuit, or the like.

The communication system may be applied to scenarios such as unmanned driving, assisted driving, intelligent driving, automated driving, connected driving, and intelligent connected driving.

It should be noted that the system architecture, the internal structure of the vehicle, and the possible application scenario described in this application are intended to describe the technical solutions of this application more clearly, and do not constitute a limitation on the technical solutions provided in this application. A person of ordinary skill in the art may learn that, with evolution of the architecture, the technical solutions provided in this application are also applicable to similar technical problems.

Based on the foregoing content, with reference to FIG. 3 to FIG. 12, the following describes in detail a method for controlling a laser headlight of a vehicle in this application.

Figure 3:
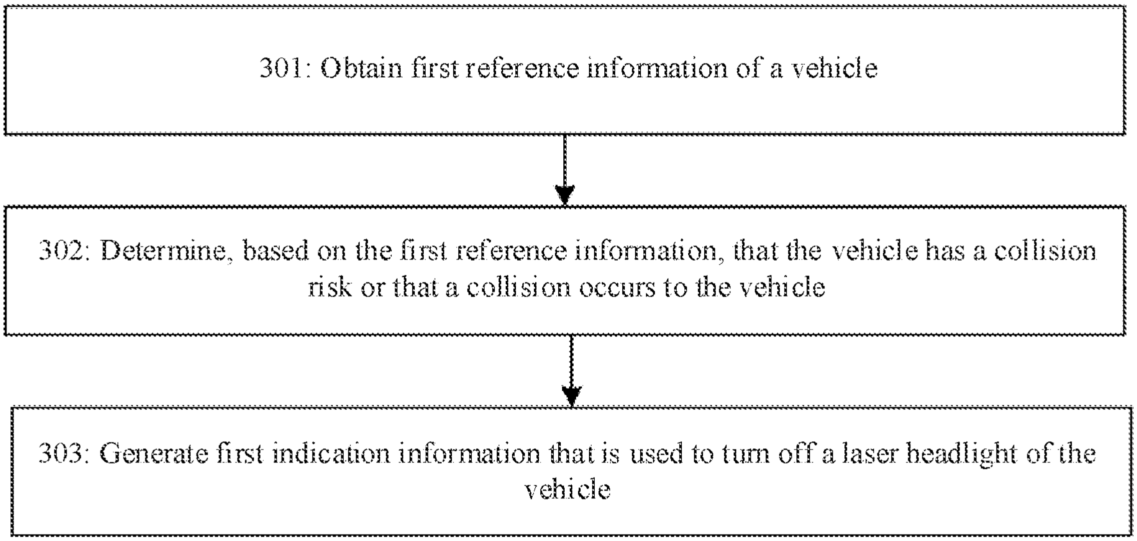
FIG. 3 is a flowchart of a method for controlling a laser headlight of a vehicle according to this application.

For example, FIG. 3 is a flowchart of a method for controlling a laser headlight of a vehicle according to this application. The method may be performed by the vehicle, for example, performed by an in-vehicle controller in the vehicle. For example, the in-vehicle controller may be the domain controller in FIG. 2*a* in the vehicle shown, the ECU shown in FIG. 2*a* in the vehicle, or the laser headlight controller shown in FIG. 2*b*. It should be noted that a name of the in-vehicle controller is merely an example, and a specific apparatus performing the following method for controlling a laser headlight of a vehicle may have another name. This is not specifically limited in this application. Alternatively, the method may be performed by the server shown in FIG. 2*d*, or may be performed by the roadside device shown in FIG. 2*d*.

For ease of description of the solution, the method is performed by the in-vehicle controller in this example. The method may include the following steps.

Step 301: The in-vehicle controller obtains first reference information of the vehicle.

Herein, the first reference information includes at least one of first map information, first information sensed by a roadside device, second information sensed by a sensing device on the vehicle, and first control information in the vehicle.

In a possible implementation, the first reference information includes the first map information. The first map information includes information about a first driving environment in front of the vehicle during driving, and the information about the first driving environment may indicate at least one of the following: a case in which an obstacle (such as a faulty vehicle, a littered item, or a road stone) exists on a road segment in front of the vehicle, a case in which a pothole exists on the road segment in front of the vehicle, a case in which a construction area exists on the road segment in front of the vehicle, a case in which a wildlife presence area exists on the road segment in front of the vehicle, first risk information of the road segment in front of the vehicle, a case in which the road segment in front of the vehicle is a gathering area of vulnerable road users (VRU) (such as a pedestrian, a bicyclist, and a motorcyclist), and a first weather condition (for example, bad whether such as heavy wind, heavy fog, heavy rain, or heavy snow) of the road segment in front of the vehicle.

Further, for example, the risk information may optionally be represented by a risk level. For example, there are five risk levels. The risk information may be represented as a level-0 risk, a level-1 risk, a level-2 risk, a level-3 risk, a level-4 risk, or a level-5 risk. A higher risk level indicates a higher risk. For example, the first risk information may be the level-1 risk, the level-2 risk, the level-3 risk, the level-4 risk, or the level-5 risk. In other words, when the first risk information is the level-1 risk, the level-2 risk, the level-3 risk, the level-4 risk, or the level-5 risk, the vehicle has a collision risk. For another example, the risk information may alternatively be an identifier indicating whether a risk exists, such as "YES" or "NO". "YES" indicates that a risk exists, and "NO" indicates that no risk exists. The first risk information may be "YES". In other words, when the first risk information is "YES", it indicates that the vehicle has a collision risk. For still another example, the risk information may alternatively be an identifier indicating whether a risk exists, such as an identifier "0" or "1". "0" indicates that no risk exists, and "1" indicates that a risk exists. The first risk information may be "1". In other words, when the first risk information is "1", it indicates that the vehicle has a collision risk. For yet another example, the first risk information may alternatively be an identifier indicating risk severity, such as "high" (or "11"), "medium" (or "01"), or "low" (or "00"). "high" (or "11") indicates a high risk, "medium" (or "01") indicates a medium risk, and "low" (or "00") indicates a low risk. The first risk information may be "high" or "medium". In other words, when the first risk information is "high" or "medium", it indicates that the vehicle has a collision risk. It may also be understood as that a risk level corresponding to the first risk information is greater than a risk threshold.

It should be noted that the foregoing representation manners of the first risk information are merely examples. In addition, a specific manner used to represent the first risk information may be predefined in a protocol, or may be agreed upon in advance. This is not limited in this application.

In a possible implementation, the in-vehicle controller may obtain the first map information from the server. For a possible implementation, refer to the following description of FIG. 4, and details are not described herein.

In a possible implementation, the first reference information includes the first information sensed by the roadside device, and the first information sensed by the roadside device includes information about a second driving environment in front of the vehicle during driving. The information about the second driving environment may indicate: a case in which an obstacle exists on a road segment in front of the vehicle, a case in which a pothole exists on the road segment in front of the vehicle, a case in which a construction area exists on the road segment in front of the vehicle, a case in which a wildlife presence area exists on the road segment in front of the vehicle, first risk information of the road segment in front of the vehicle, a case in which the road segment in front of the vehicle is a gathering area of vulnerable road users, and a first weather condition of the road segment in front of the vehicle. For the obstacle, the first risk information, the VRU, and the first weather condition, refer to the foregoing related descriptions. Details are not described herein.

It should be noted that the first information sensed by the roadside device may be raw data, feature-level data, or target-level data. The raw data is data sensed by the roadside device. The feature-level data is data that is extracted from the raw data sensed by the roadside device and that can represent a feature of a detected object. The target-level data is data that is extracted from the raw data or the feature-level data and that can represent an attribute of the detected object.

Figure 7:
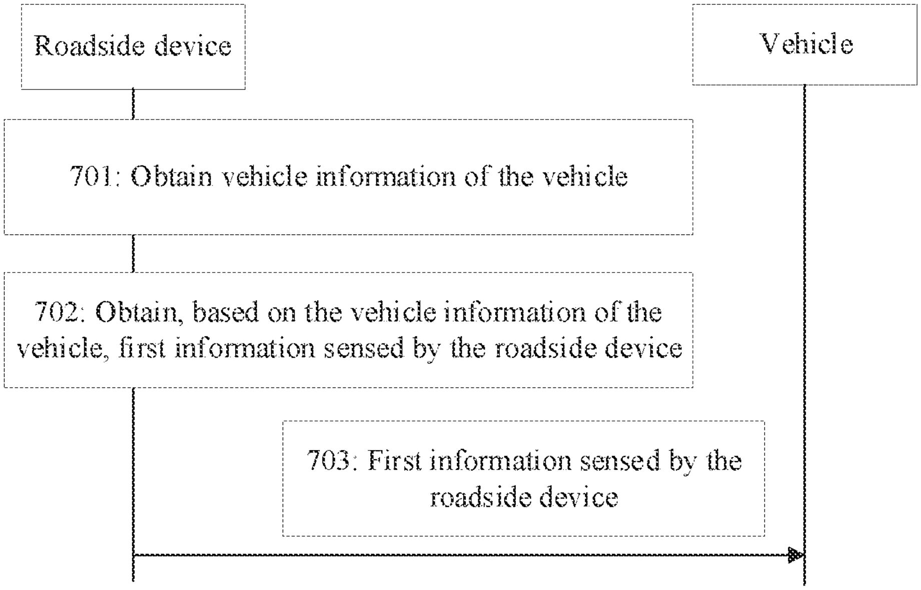
FIG. 7 is a flowchart of a method for obtaining first information sensed by a roadside device according to this application.

In a possible implementation, for a possible implementation of obtaining the first information sensed by the roadside device, refer to the following description of FIG. 7. Details are not described herein.

In a possible implementation, the second information sensed by the sensing device on the vehicle includes a first TTC, a first kinetics parameter, or collision indication information. Further, optionally, the first kinetics parameter includes but is not limited to a first longitudinal deceleration, a first transverse acceleration, a change rate of the first longitudinal deceleration, a change rate of the first transverse acceleration, and the like.

It should be noted that the first TTC or the first kinetics parameter that is included in the second information sensed by the sensing device on the vehicle may be feature-level data or target-level data. The collision indication information included in the second information sensed by the sensing device on the vehicle may be raw data, feature-level data, or target-level data. For the raw data, the feature-level data, and the target-level data, refer to the foregoing related descriptions. Details are not described herein.

In a possible implementation, for a possible implementation of obtaining the second information sensed by the sensing device on the vehicle, refer to the following related descriptions. Details are not described herein.

In a possible implementation, the first control information in the vehicle includes an active signal of a safety-type advanced driver assistance system (ADAS), information that is generated by an airbag control unit and that is used to inflate an airbag, or information that is generated by another control unit and that is used to trigger an irreversible restraint apparatus to obtain information. The active signal of the safety-type ADAS includes but is not limited to an active signal of an AEB system, an active signal of an ESS system, an active signal of an AES system, an active signal of an FCTA system, or the like.

In a possible implementation, for a possible implementation of obtaining the first control information in the vehicle, refer to the following related descriptions. Details are not described herein.

Step 302: The in-vehicle controller may determine, based on the first reference information, that the vehicle has a collision risk or that a collision occurs to the vehicle.

In a possible implementation, the in-vehicle controller may determine, based on the first map information, whether the vehicle has the collision risk. For an example implementation, refer to the following description of Case 1.

Alternatively, it may be determined, based on the first information sensed by the roadside device, whether the vehicle has the collision risk. For an example implementation, refer to the following description of Case 2.

Alternatively, it may be determined, based on the second information (such as the first TTC or the first kinetics parameter) sensed by the sensing device on the vehicle, that the vehicle has the collision risk. For example implementations, refer to the following descriptions of Case 3.1 and Case 3.2 in Case 3.

Alternatively, it may be determined, based on the second information sensed by the sensing device on the vehicle (such as collision indication information sensed by a collision sensor), that the collision occurs to the vehicle. For an example implementation, refer to the following description of Case 3.3 in Case 3.

Alternatively, it may be determined, based on the first control information (such as the active signal of the safety-type ADAS) in the vehicle, that the vehicle has the collision risk. For an example implementation, refer to the following description of Case 4.1 in Case 4.

Alternatively, it may be determined, based on the first control information (such as the information that is generated by the airbag control unit and that is used to inflate the airbag) in the vehicle, that the collision occurs to the vehicle. For an example implementation, refer to the following description of Case 4.2 in Case 4.

Alternatively, a possible combination of the foregoing cases may be used to determine that the vehicle has the collision risk or that the collision occurs to the vehicle. For an example implementation, refer to the following related descriptions. Details are not described herein.

Step 303: The in-vehicle controller generates first indication information that is used to turn off the laser headlight of the vehicle.

In a possible implementation, a specific form of the first indication information may be agreed upon in advance, or may be predefined in a protocol.

Further, optionally, the in-vehicle controller may send the first indication information to a laser headlight driver, to indicate the laser headlight driver to turn off the laser headlight. With reference to FIG. 2*a*, the domain controller or the ECU sends the first indication information to the laser headlight driver. Correspondingly, the laser headlight driver may control, based on the received first indication information, to turn off the laser headlight. With reference to FIG. 2*b*, the laser headlight controller may send the first indication information to two laser headlight drivers. Correspondingly, the laser headlight drivers each may control, based on the received first indication information, to turn off the laser headlight. Optionally, after turning on the laser headlight, the laser headlight driver may further send first response information to the in-vehicle controller. In this way, the in-vehicle controller can determine that the laser headlight is turned on.

Through Steps 301 to 303, when determining that the vehicle has the collision risk or the collision occurs to the vehicle, the in-vehicle controller may control, based on the obtained first reference information of the vehicle, to turn off the laser headlight. This helps prevent laser light from leaking out of a laser light source due to damage caused to the laser headlight by a vehicle collision. Therefore, use safety of the laser headlight can be improved.

It should be noted that FIG. 3 is described by using an example in which the in-vehicle controller performs the method. If the method shown in FIG. 3 is performed by the roadside device or the server, the method may further include the following step: The roadside device or the server sends the first indication information to the vehicle. The in-vehicle controller receives the first indication information from the server or the roadside device and controls, based on the first indication information, to turn off the laser headlight. This helps simplify processing logic of the in-vehicle controller.

Specifically, the vehicle may receive the first indication information from the roadside device or the server through an OBU. In a possible implementation, the vehicle may control, based on the first indication information, to turn off the laser headlight. In another possible implementation, after receiving the first indication information, the in-vehicle controller may further determine whether the roadside device or the server that sends the first indication information is authorized. If the roadside device or the server is authorized, the in-vehicle controller may control to turn off the laser headlight. If the roadside device or the server is unauthorized, the in-vehicle controller may ignore the first indication information. Specifically, in a process in which the roadside device or the server establishes a connection to the vehicle, certificate information may be sent to the vehicle through a V2X message. The vehicle may determine, by parsing the certificate information, whether the roadside device or the server is authorized. Whether the roadside device or the server is authorized is further determined, so that vehicle communication security can be improved.

The following describes possible implementations of obtained first reference information in different cases.

Case 1: The first reference information includes first map information.

Based on Case 1, the following shows an example of a possible manner for obtaining the first map information.

Figure 4:
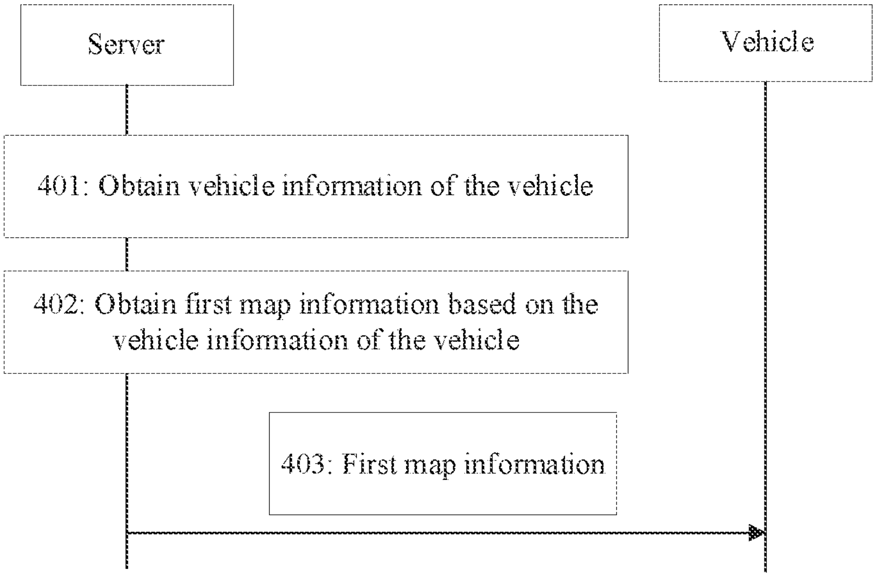
FIG. 4 is a flowchart of a method for obtaining first map information according to this application.

FIG. 4 is a flowchart of a method for obtaining first map information according to this application. For example, the method is performed by an in-vehicle controller. The method includes the following steps.

Step 401: A server obtains vehicle information of a vehicle.

Herein, the vehicle information of the vehicle includes a vehicle ID, a location of the vehicle, and the like. For example, the vehicle may send, to the server, a first request message used to request the first map information, where the first request message may carry the vehicle information.

Step 402: The server may obtain the first map information based on the vehicle information of the vehicle.

For the first map information, refer to the description of Step 301. Details are not described herein.

Step 403: The server sends the first map information to the vehicle. Correspondingly, the vehicle receives the first map information from the server.

In a possible implementation, the vehicle may send the first request message to the server periodically or in real time. Correspondingly, the server sends the first map information to the vehicle periodically or in real time.

With reference to FIG. 2*b*, the vehicle may receive the first map information from the server through an OBU.

Through Steps 401 to 403, the vehicle may obtain the first map information.

It should be noted that if the method shown in FIG. 3 is performed by the server, the server may obtain the first map information based on Steps 401 and 402, and may determine, based on the first map information, whether the vehicle has a collision risk. Step 403 does not need to be performed.

If the method shown in FIG. 3 is performed by a roadside device, Step 403 may be: the server sends the first map information to the roadside device. Correspondingly, the roadside device receives the first map information from the server. Specifically, the roadside device may send the first map information to the server in a wireless manner.

Figure 5:
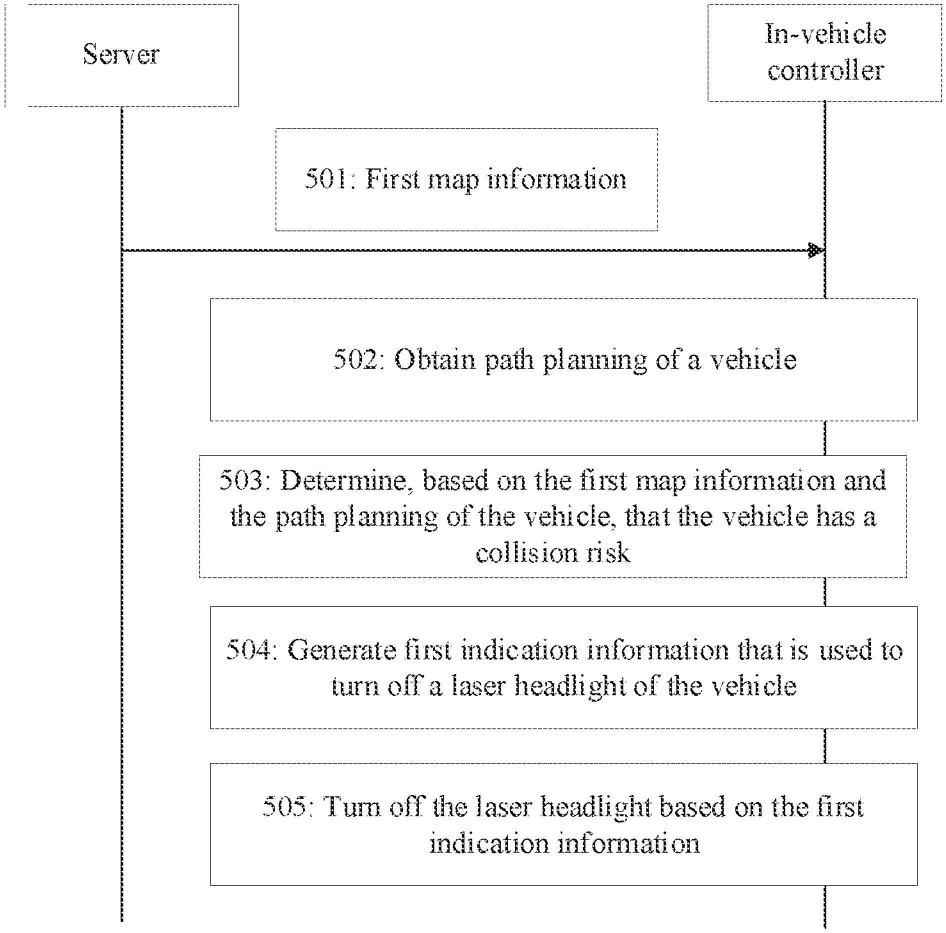
FIG. 5 is a flowchart of a method for controlling a laser headlight of a vehicle according to this application.

Based on Case 1, FIG. 5 is a flowchart of a method for controlling a laser headlight of a vehicle according to this application. In this example, the in-vehicle controller controls the laser headlight.

Step 501: The server sends the first map information to the in-vehicle controller. Correspondingly, the in-vehicle controller receives the first map information from the server.

Herein, the first map information includes information about a first driving environment in front of the vehicle during driving. For details, refer to the foregoing related descriptions. Details are not described herein.

For Step 501, refer to the description of Step 403. Details are not described herein.

Step 502: The in-vehicle controller obtains path planning of the vehicle.

For example, the in-vehicle controller may obtain the path planning of the vehicle from a navigation apparatus on the vehicle. Alternatively, the in-vehicle controller may determine the path planning of the vehicle based on a chassis parameter of the vehicle. For example, it may be determined that the vehicle is going straight if a value of an angle parameter does not change enormously, a turn signal is not triggered, or the like.

Step 503: The in-vehicle controller determines, based on the first map information and the path planning of the vehicle, that the vehicle has a collision risk.

In a possible implementation, the in-vehicle controller determines, based on the path planning of the vehicle, that the information about the first driving environment is information about a road segment to be passed by the vehicle; and determines, based on the information about the first driving environment, that the vehicle has the collision risk. It should be noted that the information about the first driving environment is the information about the road segment to be passed by the vehicle. This indicates that the information about the first driving environment is highly correlated with a driving track of the vehicle, and therefore indicates that there is a higher collision risk of the vehicle and the laser headlight needs to be turned off.

For example, the information about the first driving environment is that an obstacle exists on the road segment in front of the vehicle. If it is determined that an obstacle exists on the road segment to be passed by the vehicle, and the obstacle is located in a lane in which the vehicle travels, it indicates that there is a collision risk between the vehicle and the obstacle. For the obstacle, refer to an obstacle 1 in FIG. 6. Alternatively, if it is determined that an obstacle exists on the road segment to be passed by the vehicle, and the obstacle is located in a same-direction lane of the lane in which the vehicle travels, it may also indicate that there is a collision risk between the vehicle and the obstacle. For the obstacle, refer to an obstacle 2 in FIG. 6.

For example, the information about the first driving environment is that a pothole exists on the road segment in front of the vehicle. If it is determined that a pothole exists on the road segment to be passed by the vehicle, and the pothole is located in the lane in which the vehicle travels, it is determined that the vehicle has the collision risk.

For example, the information about the first driving environment is that a construction area exists on the road segment in front of the vehicle. If it is determined that a construction area exists on the road segment to be passed by the vehicle, and the construction area is located in the lane in which the vehicle travels, it is determined that the vehicle has the collision risk.

For example, the information about the first driving environment is that a wildlife presence area exists on the road segment in front of the vehicle. If it is determined that a wildlife presence area exists on the road segment to be passed by the vehicle, and the wildlife presence area is located in the lane in which the vehicle travels, it is determined that the vehicle has the collision risk.

For example, the information about the first driving environment is first risk information of the road segment in front of the vehicle. If it is determined that the first risk information of the road segment to be passed by the vehicle exists, it is determined that the vehicle has the collision risk. With reference to representation manners of risk information in Step 301, if it is determined that the first risk information is a level-1 risk, a level-2 risk, a level-3 risk, a level-4 risk, a level-5 risk, "YES", "1", "high" (or "11"), or "medium" (or "01"), it may indicate that the vehicle has the collision risk.

For example, the information about the first driving environment is that the road segment in front of the vehicle is a gathering area of vulnerable road users. If it is determined that the road segment to be passed by the vehicle is a gathering area of vulnerable road users, and the gathering area of vulnerable road users is located in the lane in which the vehicle travels, it is determined that the vehicle has the collision risk.

For example, the information about the first driving environment is a first weather condition of the road segment in front of the vehicle. If it is determined that the road segment to be passed by the vehicle is the first weather condition, that is, bad weather such as heavy wind, heavy fog, heavy rain, or heavy snow exists on the road segment to be passed by the vehicle, it is determined that the vehicle has the collision risk.

Step 504: The in-vehicle controller generates first indication information that is used to turn off the laser headlight of the vehicle.

For Step 504, refer to the description of Step 303. Details are not described herein.

Step 505: The in-vehicle controller turns off the laser headlight based on the first indication information.

It may also be understood that the in-vehicle controller may control, based on the first indication information, to turn off the laser headlight. With reference to FIG. 2*a*, the in-vehicle controller may send the first indication information to two laser headlight drivers. Correspondingly, the laser headlight drivers each may turn off the laser headlight based on the received first indication information.

Case 2: The first parameter information includes first information sensed by a roadside device.

FIG. 7 is a flowchart of a method for obtaining first information sensed by a roadside device according to this application. For example, the method is performed by a vehicle. The method includes the following steps.

Step 701: The roadside device obtains vehicle information of the vehicle.

Herein, the vehicle information of the vehicle includes a vehicle ID, a location of the vehicle, and the like. For example, the vehicle may send, to the roadside device, a second request message used to request the first information sensed by the roadside device, where the second request message may carry the vehicle information.

With reference to FIG. 2*d*, the roadside device may sense vehicle information in a specific range. The specific range that can be sensed may be a circle or a sector whose radius is greater than or equal to a range of a laser headlight. Generally, the range of the laser headlight is 600 m, and the specific range that can be sensed by the roadside device may be a circle or a sector whose radius is 600 m.

Step 702: The roadside device may obtain, based on the vehicle information of the vehicle, the first information sensed by the roadside device.

In a possible implementation, the roadside device may determine, based on the identifier and the location of the vehicle, the first information sensed by the roadside device. It may also be understood that the first information sensed by the roadside device may be information associated with the vehicle information included in the sent second request message.

Step 703: The roadside device sends, to the vehicle, the first information sensed by the roadside device. Correspondingly, the vehicle may receive the first information sensed by the roadside device.

In a possible implementation, the roadside device may broadcast a road safety message (RSM) message, where the RSM message carries the first information sensed by the roadside device. Alternatively, the roadside device may send the RSM message to the vehicle in a unicast manner. Correspondingly, an in-vehicle controller may receive the RSM message from the roadside device through an OBU in the vehicle, and obtain, by parsing the RSM message, the first information sensed by the roadside device. It should be understood that the RSM message is mainly used to identify an event, for example, identify that a vehicle accident occurs, a vehicle exception occurs, or a foreign object enters the vehicle.

Through Steps 701 to 703, the vehicle may obtain the first information sensed by the roadside device.

It should be noted that, if the method shown in FIG. 7 is performed by the roadside device, the roadside device may obtain, based on Steps 701 and 702, the first information sensed by the roadside device; and may determine, based on the first information sensed by the roadside device, whether the vehicle has a collision risk. Step 703 does not need to be performed.

If the method shown in FIG. 7 is performed by a server, Step 703 may be: the roadside device sends, to the server, the first information sensed by the roadside device. Correspondingly, the server receives, from the roadside device, the first information sensed by the roadside device. Specifically, the server may send, to the roadside device in a wireless manner, the first information sensed by the roadside device.

Figure 8:
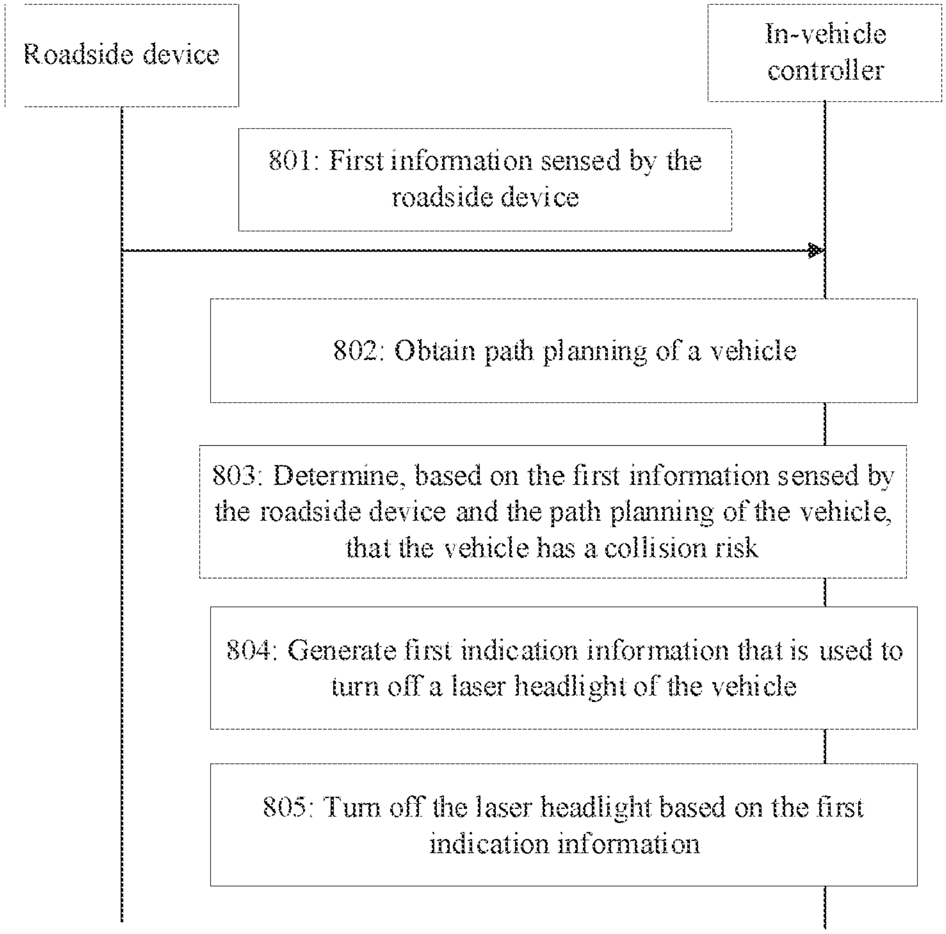
FIG. 8 is a flowchart of another method for controlling a laser headlight of a vehicle according to this application.

Based on Case 2, FIG. 8 is a flowchart of another method for controlling a laser headlight of a vehicle according to this application. In this example, the in-vehicle controller controls the laser headlight.

Step 801: The roadside device sends, to the in-vehicle controller, the first information sensed by the roadside device. Correspondingly, the in-vehicle controller may receive the first information sensed by the roadside device.

Herein, the first information sensed by the roadside device includes information about a second driving environment in front of the vehicle during driving. For the information about the second driving environment, refer to the foregoing related descriptions. Details are not described herein. For Step 801, refer to the description of Step 703. Details are not described herein.

Step 802: The in-vehicle controller obtains path planning of the vehicle.

For Step 802, refer to the description of Step 502. Details are not described herein.

Step 803: The in-vehicle controller determines, based on the first information sensed by the roadside device and the path planning of the vehicle, that the vehicle has a collision risk.

In a possible implementation, the in-vehicle controller determines, based on the path planning of the vehicle, that the information about the second driving environment is information about a road segment to be passed by the vehicle; and determines, based on the information about the second driving environment, that the vehicle has the collision risk. It should be noted that the information about the second driving environment is the information about the road segment to be passed by the vehicle. This indicates that the information about the second driving environment is highly correlated with a driving track of the vehicle, and therefore indicates that the vehicle has the collision risk.

Step 804: The in-vehicle controller generates first indication information that is used to turn off the laser headlight of the vehicle.

For Step 804, refer to the description of Step 504. Details are not described herein.

Step 805: The in-vehicle controller turns off the laser headlight based on the first indication information.

For Step 805, refer to the description of Step 505. Details are not described herein.

Case 3: The first reference information includes second information sensed by a sensing device on the vehicle.

Based on Case 3, the following shows examples of three possible types of second information sensed by the sensing device on the vehicle.

Case 3.1: The second information sensed by the sensing device on the vehicle includes a first TTC.

Based on Case 3.1, the sensing device on the vehicle may be, for example, a radar (such as a millimeter-wave radar or a lidar) or a camera.

In a possible implementation, the sensing device on the vehicle may calculate the first TTC in real time based on raw data sensed by the sensing device on the vehicle, and send the calculated first TTC to an in-vehicle controller. Correspondingly, the in-vehicle controller may receive the first TTC from the sensing device on the vehicle. If the first TTC meets a first preset condition, the in-vehicle controller determines that the vehicle has a collision risk. For example, the first preset condition may be a first preset value, where the first preset value is not greater than 4 seconds(s). For example, if the first TTC is less than the first preset value, it indicates that a vehicle collision is about to occur. In other words, it is determined that the vehicle has the collision risk. It should be noted that, a process of determining the first TTC may be: the sensing device on the vehicle determines the first TTC based on the sensed raw data. Alternatively, the process of determining the first TTC may be: the sensing device on the vehicle sends the sensed raw data to a processor (such as a processor on the vehicle or an external processor independent of the vehicle), and the processor determines the first TTC based on the raw data sent by the sensing device on the vehicle. Alternatively, the process of determining the first TTC may be: the sensing device on the vehicle determines feature-level data (such as distance information and speed information) based on the sensed raw data, and sends the feature-level data to the processor; and the processor determines target-level data (namely, the first TTC) based on the feature-level data.

In another possible implementation, after obtaining the first TTC, the vehicle (such as the sensing device on the vehicle or the processor) may further send the first TTC to a server or a roadside device. If determining that the first TTC meets the first preset condition, the roadside device or the server determines that the vehicle has the collision risk, and may further generate first indication information that is used to turn off a laser headlight of the vehicle.

It should be noted that, after obtaining the first TTC, the sensing device on the vehicle or the processor may directly send third indication information to the in-vehicle controller if determining that the TTC meets the first preset condition, where the third indication information indicates to turn off the laser headlight. Correspondingly, the in-vehicle controller may receive the third indication information from the sensing device on the vehicle or the processor, and control, based on the third indication information, to turn off the laser headlight.

Case 3.2: The second information sensed by the sensing device on the vehicle includes a first kinetics parameter.

Based on Case 3.1, the sensing device on the vehicle may be, for example, an ESC system, where the ESC system includes an acceleration sensor.

In a possible implementation, the ESC system in the vehicle may obtain the first kinetics parameter, and send the first kinetics parameter to an in-vehicle controller. Correspondingly, the in-vehicle controller may receive the first kinetics parameter from the ESC system. If the first kinetics parameter meets a second preset condition, the in-vehicle controller determines that the vehicle has a collision risk. It should be understood that the first kinetics parameter may be used to indicate stability of the vehicle.

In another possible implementation, after obtaining the first kinetics parameter, the ESC system in the vehicle may further send the first kinetics parameter to a server or a roadside device. If determining that the first kinetics parameter meets the second preset condition, the roadside device or the server determines that the vehicle has the collision risk, and may further generate first indication information that is used to turn off a laser headlight of the vehicle.

Further, optionally, the first kinetics parameter includes but is not limited to a first transverse acceleration, a first longitudinal acceleration, a change rate of the first transverse acceleration, or a change rate of the first longitudinal acceleration.

Example 1: The First Kinetics Parameter is a First Longitudinal Deceleration In a possible implementation, the in-vehicle controller may obtain the first longitudinal deceleration from the ESC system. If the first longitudinal deceleration is greater than a second preset value, the in-vehicle controller may generate the first indication information that is used to turn off the laser headlight of the vehicle. For example, the second preset value equals 5 $m/s^2$. Herein, the second preset value is the second preset condition.

It should be noted that, after obtaining the first longitudinal deceleration, the ESC system sends third indication information to the in-vehicle controller if it is determined that the first longitudinal deceleration is greater than the second preset value, where the third indication information indicates to turn off the laser headlight. Correspondingly, the in-vehicle controller may receive the third indication information from the ESC system, and may control, based on the third indication information, to turn off the laser headlight.

Example 2: The First Kinetics Parameter is the First Transverse Acceleration In a possible implementation, the in-vehicle controller may obtain the first transverse acceleration from the ESC system. If the first transverse acceleration is greater than a third preset value, the in-vehicle controller may generate the first indication information that is used to turn off the laser headlight of the vehicle. For example, the third preset value equals 3 $m/s^2$. Herein, the third preset value is the second preset condition.

It should be noted that, the ESC system obtains the first transverse acceleration and may send, if it is determined that the first transverse acceleration is greater than the third preset value, third indication information to the in-vehicle controller, where the third indication information indicates to turn off the laser headlight. Correspondingly, the in-vehicle controller may receive the third indication information from the ESC system, and may control, based on the third indication information, to turn off the laser headlight.

Example 3: The First Kinetics Parameter is a Change Rate of a First Longitudinal Deceleration In a possible implementation, the in-vehicle controller may obtain the change rate of the first longitudinal deceleration from the ESC system. If the change rate of the first longitudinal deceleration is greater than a fourth preset value, the in-vehicle controller may generate the first indication information that is used to turn off the laser headlight of the vehicle. For example, the fourth preset value indicates that the change rate per unit time (such as 0.5 s) is 5 $m/s^3$. Herein, the fourth preset value is the second preset condition.

It should be noted that, the ESC system obtains the change rate of the first longitudinal deceleration and may send, if the change rate of the first longitudinal deceleration is greater than the fourth preset value, third indication information to the in-vehicle controller, where the third indication information indicates to turn off the laser headlight. Correspondingly, the in-vehicle controller may receive the third indication information from the ESC system, and may control, based on the third indication information, to turn off the laser headlight.

Example 4: The Change Rate of the First Transverse Acceleration is Used as an Example In a possible implementation, the in-vehicle controller may obtain the change rate of the first transverse acceleration from the ESC system. If the change rate of the first transverse acceleration is greater than a fifth preset value, the in-vehicle controller generates the first indication information that is used to turn off the laser headlight of the vehicle. For example, the fifth preset value indicates that the change rate per unit time (such as 0.5 s) is 5 $m/s^3$. Herein, the fifth preset value is the second preset condition.

It should be noted that, the ESC system obtains the change rate of the first transverse acceleration and may send, if the change rate of the first transverse acceleration is greater than the fifth preset value, third indication information to the in-vehicle controller, where the third indication information indicates to turn off the laser headlight. Correspondingly, the in-vehicle controller may receive the third indication information from the ESC system, and may control, based on the third indication information, to turn off the laser headlight.

It should be noted that, if the in-vehicle controller obtains at least two of the first TTC, the first longitudinal deceleration, the first transverse acceleration, the change rate of the first longitudinal deceleration, and the change rate of the first transverse acceleration, it is determined that the vehicle has the collision risk, provided that one of the at least two of the first TTC, the first longitudinal deceleration, the first transverse acceleration, the change rate of the first longitudinal deceleration, and the change rate of the first transverse acceleration meets a corresponding preset condition. For example, the in-vehicle controller obtains the first TTC, the first longitudinal deceleration, and the first transverse acceleration. In this case, if the first TTC meets the first preset condition, the first longitudinal deceleration does not meet the second preset condition, and the first transverse acceleration does not meet a third preset condition, it is still determined that the vehicle has the collision risk.

Case 3.3: The second information sensed by the sensing device on the vehicle includes the collision indication information.

Based on Case 3.3, the sensing device on the vehicle may be, for example, a collision sensor. For the collision sensor, refer to the foregoing related descriptions. Details are not described herein.

In a possible implementation, the collision indication information may be a collision signal sent by the collision sensor after the collision sensor detects that a collision occurs to the vehicle. For example, after sensing that the collision occurs to the vehicle, a collision sensor disposed around a body of the vehicle may send the collision indication information to an in-vehicle sensor. Correspondingly, the in-vehicle controller may receive the collision indication information from the collision sensor. Further, after obtaining the collision indication information, the in-vehicle controller may generate first indication information that is used to turn off a laser headlight of the vehicle. It should be noted that, after obtaining the collision indication information, the in-vehicle controller may generate the first indication information that is used to turn off the laser headlight of the vehicle, regardless of a collision strength and direction that are indicated by the collision indication information.

Figure 9:
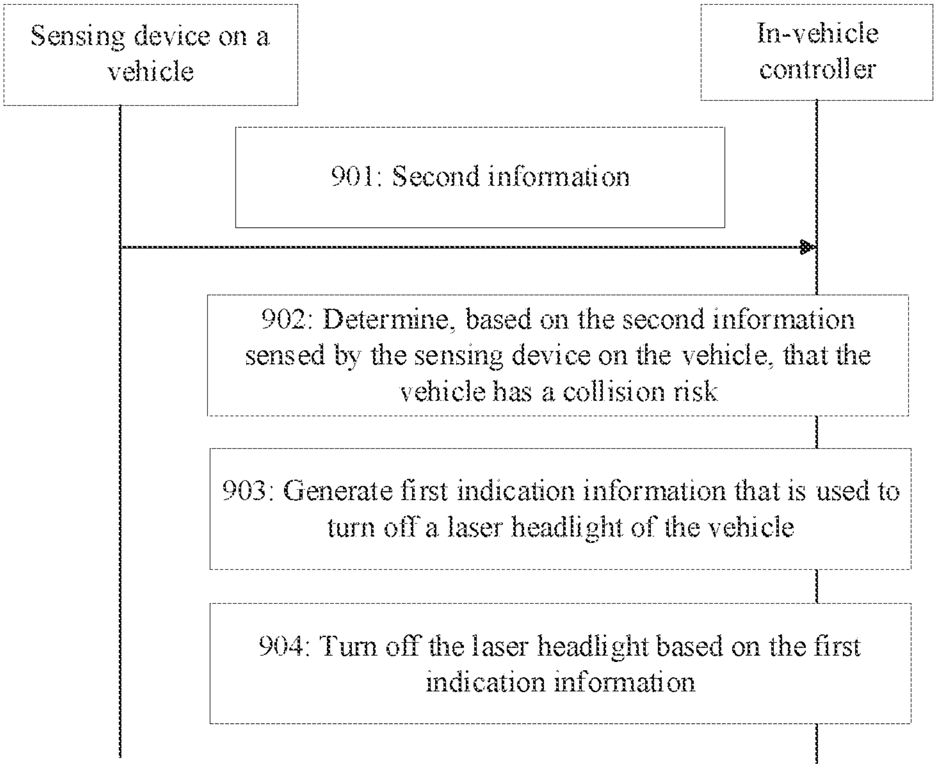
FIG. 9 is a flowchart of still another method for controlling a laser headlight of a vehicle according to this application.

Based on Case 3, FIG. 9 is a flowchart of still another method for controlling a laser headlight of a vehicle according to this application. In this example, the in-vehicle controller controls the laser headlight.

Step 901: The in-vehicle controller obtains the second information sensed by the sensing device on the vehicle.

Step 902: The in-vehicle controller determines, based on the second information sensed by the sensing device on the vehicle, that the vehicle has a collision risk.

For Steps 901 and 902, refer to the descriptions of Cases 3.1 to 3.3.

Step 903: The in-vehicle controller generates first indication information that is used to turn off the laser headlight of the vehicle.

For Step 903, refer to the description of Step 504. Details are not described herein.

Step 904: The in-vehicle controller turns off the laser headlight based on the first indication information.

For Step 904, refer to the description of Step 505. Details are not described herein.

Case 4: The first reference information includes first control information in a vehicle.

Case 4.1: The first control information in the vehicle includes an active signal of a safety-type ADAS.

In a possible implementation, active signals of safety-type ADASs include but are not limited to an active signal of an AEB system, an active signal of an ESS system, an active signal of an AES system, and an active signal of an FCTA system.

In a possible implementation, when receiving the active signal of the safety-type ADAS, an in-vehicle controller may determine that the vehicle has a collision risk. It should be understood that, when the active signal of the safety-type ADAS is triggered, it indicates that the vehicle has the collision risk.

Figure 10:
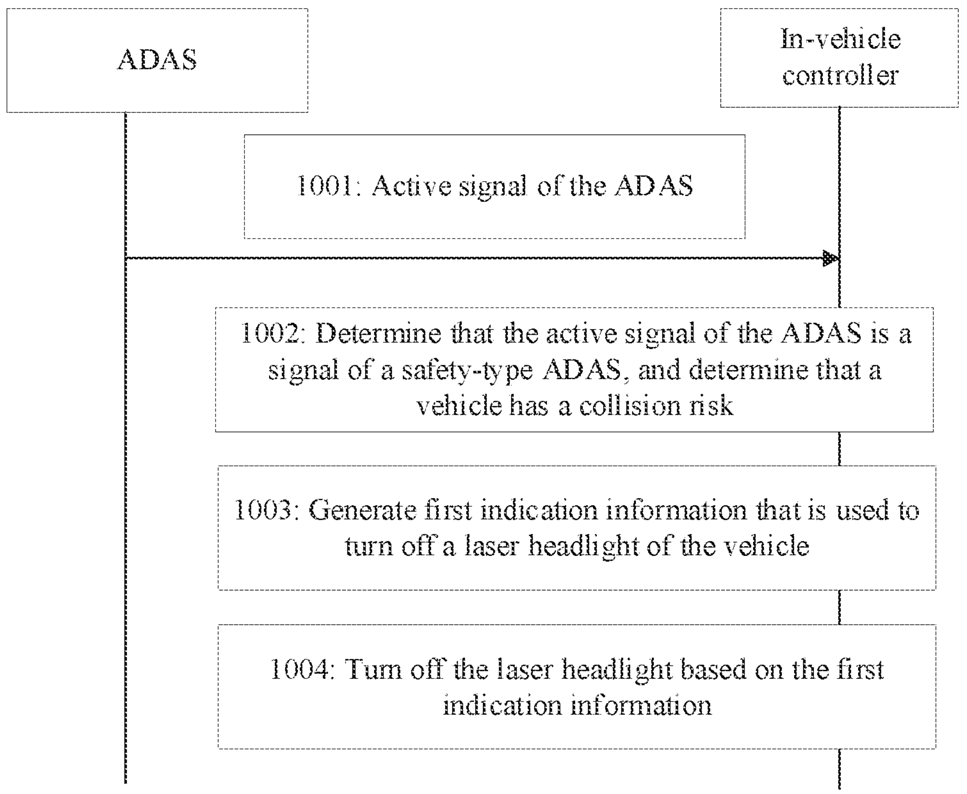
FIG. 10 is a flowchart of still another method for controlling a laser headlight of a vehicle according to this application.

Based on Case 4.1, FIG. 10 is a flowchart of still another method for controlling a laser headlight of a vehicle according to this application. In this example, the in-vehicle controller controls the laser headlight.

Step 1001: The in-vehicle controller obtains an active signal of an ADAS.

In a possible implementation, after the active signal of the ADAS is triggered, the ADAS may send the active signal of the ADAS to the in-vehicle controller.

Step 1002: The in-vehicle controller determines that the active signal of the ADAS is the active signal of the safety-type ADAS, and determines that the vehicle has the collision risk.

For example, when determining that the active signal of the safety-type ADAS is any one of the active signal of the AEB system, the active signal of the ESS system, the active signal of the AES system, and the active signal of the FCTA system, the in-vehicle controller may determine that the vehicle has the collision risk.

Step 1003: The in-vehicle controller generates first indication information that is used to turn off the laser headlight of the vehicle.

For Step 1003, refer to the description of Step 504. Details are not described herein.

Step 1004: The in-vehicle controller turns off the laser headlight based on the first indication information.

For Step 1004, refer to the description of Step 505. Details are not described herein.

Case 4.2: The first control information in the vehicle includes information that is generated by an airbag control unit and that is used to inflate an airbag.

In a possible implementation, after sensing that a collision occurs to the vehicle, a collision sensor disposed around a body of the vehicle may send collision strength and direction information to the airbag control unit or a control unit of an irreversible restraint apparatus. When the airbag control unit determines that a strength of a collision signal reaches a preset collision strength, a gas generating agent is ignited by using an airbag igniter, and a large amount of gas is generated. Alternatively, when the control unit of the irreversible restraint apparatus determines that the strength of the collision signal reaches the preset collision strength, an active signal of the irreversible restraint apparatus may be triggered.

It should be noted that the airbag control unit and the control unit of the irreversible restraint apparatus may be in-vehicle controllers or independent controllers. When the airbag control unit is an independent controller, the airbag control unit further sends, to the in-vehicle controller, information used to inflate the airbag. When the control unit of the irreversible restraint apparatus is an independent controller, the control unit of the irreversible restraint apparatus further sends the active signal of the irreversible restraint apparatus to the in-vehicle controller.

Figure 11:
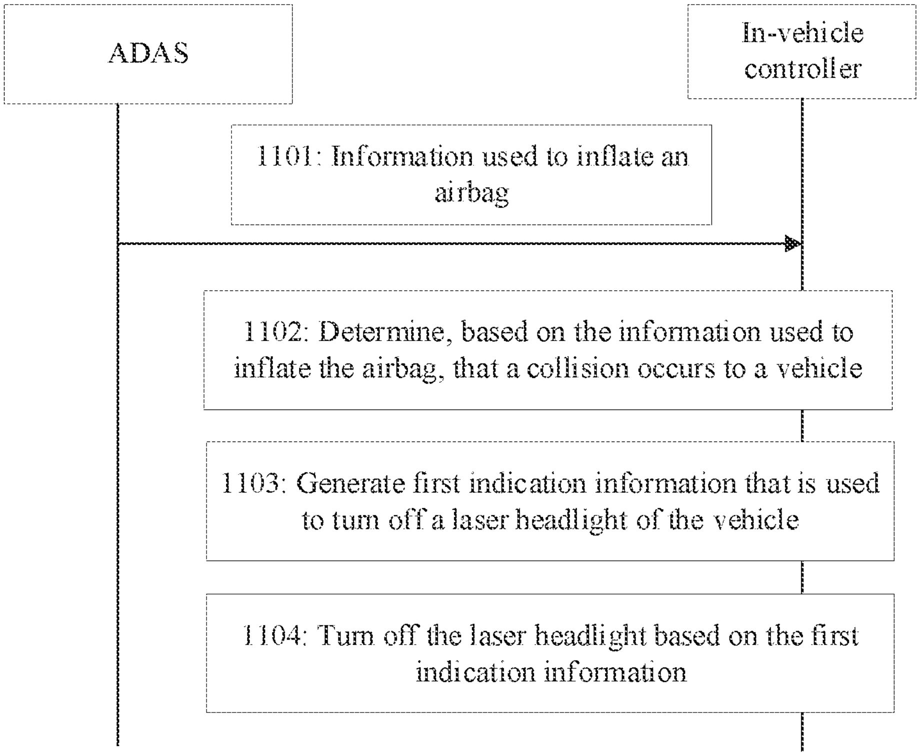
FIG. 11 is a flowchart of still another method for controlling a laser headlight of a vehicle according to this application.

Based on Case 4.2, FIG. 11 is a flowchart of still another method for controlling a laser headlight of a vehicle according to this application. In this example, the in-vehicle controller controls the laser headlight.

Step 1101: The in-vehicle controller obtains the information used to inflate the airbag.

In a possible implementation, after generating the information used to inflate the airbag, the airbag control unit may send, to the in-vehicle controller, the information used to inflate the airbag.

Step 1102: The in-vehicle controller determines, based on the information used to inflate the airbag, that a collision occurs to the vehicle.

In a possible implementation, after receiving the information used to inflate the airbag, the in-vehicle controller may determine that the collision occurs to the vehicle.

Step 1103: The in-vehicle controller generates first indication information that is used to turn off the laser headlight of the vehicle.

For Step 1103, refer to the description of Step 504. Details are not described herein.

Step 1104: The in-vehicle controller turns off the laser headlight based on the first indication information.

For Step 1104, refer to the description of Step 505. Details are not described herein.

Figure 12:
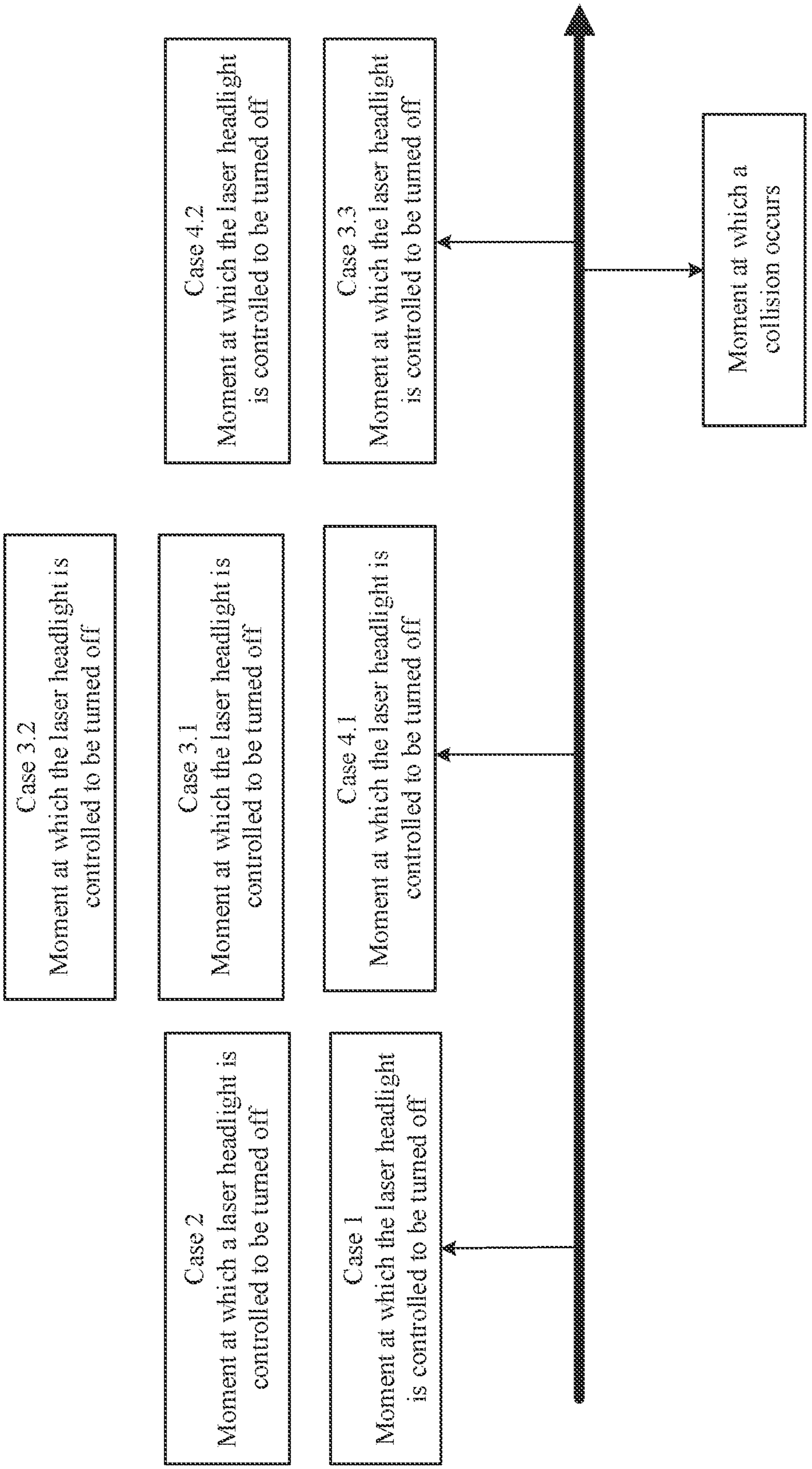
FIG. 12 is a schematic diagram depicting relationships between moments at which a laser headlight is controlled, in different cases, to be turned off and a moment at which a collision occurs to a vehicle according to this application.

Generally, for a relationship between each of the foregoing possible cases and a moment at which a collision occurs, refer to FIG. 12. In Cases 1 and 2, the moment at which the collision occurs to the vehicle is relatively far away. In Cases 3.3 and 4.2, the collision has occurred to the vehicle. In Cases 3.1, 3.2, and 4.1, the moment at which the collision occurs to the vehicle is relatively closer than that in Cases 1 and 2. It should be noted that, in FIG. 12, moments at which collisions occur in Cases 1 and 2 may be not aligned, moments at which collisions occur in Cases 3.1, 3.2, and 4.1 may be not aligned, and moments at which collisions occur in Cases 3.3 and 4.2 may be not aligned. FIG. 12 is merely an example.

It should be noted that it may alternatively be determined, based on a combination of the foregoing cases, that the vehicle has a collision risk or that a collision occurs to the vehicle. For ease of description of the solution, the in-vehicle controller is an executor in the following examples.

Example 1: It May be Determined, Based on Cases 1 and 2, that the Vehicle has a Collision Risk In a possible implementation, the in-vehicle controller obtains the first map information in Case 1 and the first information sensed by the roadside device in Case 2. The in-vehicle controller may first determine, based on the first information sensed by the roadside device, whether there is a collision risk. If there is a collision risk, the in-vehicle controller may control to turn off the laser headlight. If there is no collision risk, the in-vehicle controller may further determine, based on the first map information, whether there is a collision risk. In other words, a priority of the first information sensed by the roadside device in Case 2 is higher than a priority of the first map information in Case 1.

Example 2: It May be Determined, Based on Cases 3.2 and 4.1, that the Vehicle has a Collision Risk In a possible implementation, the in-vehicle controller obtains the first kinetics parameter in Case 3.2 and the active signal of the safety-type ADAS in Case 4.1. To prevent the active signal of the safety-type ADAS from being triggered by mistake, the in-vehicle controller may first determine, based on the first kinetics parameter, whether there is a collision risk. If there is a collision risk, the in-vehicle controller may control to turn off the laser headlight. If there is no collision risk, the in-vehicle controller may determine that there is no collision risk.

Example 3: It May be Determined, Based on Cases 3.3 and 4.2, that the Vehicle has a Collision Risk In a possible implementation, the in-vehicle controller obtains the collision indication information in Case 3.3 and the information used to inflate the airbag in Case 4.2, and determines that a collision occurs to the vehicle.

Example 4: It is Determined, Based on at Least One of Cases 1 and 2 and at Least One of Cases 3 and 4, that the Vehicle has a Collision Risk or that a Collision Occurs to the Vehicle In a possible implementation, the in-vehicle controller obtains the first map information in Case 1 and the first TTC and/or the first kinetics parameter in Case 3. The in-vehicle controller may first determine, based on the first TTC and/or the first kinetics parameter, whether there is a collision risk. If there is a collision risk, the in-vehicle controller may control to turn off the laser headlight. If there is no collision risk, the in-vehicle controller may further determine, based on the first map information in Case 1, whether there is a collision risk.

It should be noted that, in a process of determining whether the vehicle has a collision risk, priorities of the second information sensed by the sensing device on the vehicle and the first control information in the vehicle are higher than priorities of the first map information and the first information sensed by the roadside device. It may be understood that a priority of information sensed by the vehicle is higher than a priority of information notified to the vehicle by the outside.

Certainly, other possible combinations of the foregoing cases may also be used, and are not listed herein.

It should be noted that, that the in-vehicle controller specifically determines, based on which case or a combination of which cases, whether the vehicle has a collision risk or a collision occurs to the vehicle may be agreed upon in advance, or may be predefined in a protocol. This is not limited in this application.

In this application, second reference information may be further obtained after the indication information used to turn off the laser headlight of the vehicle is generated when it is determined, based on the first reference information, that the vehicle has a collision risk. Then, it is determined, based on the second reference information, that the collision risk is eliminated, and second indication information used to turn on the laser headlight is generated. The second reference information includes at least one of second map information, third information sensed by the roadside device, fourth information sensed by the sensing device on the vehicle, and second control information in the vehicle. Further, optionally, the vehicle may turn on the laser headlight again based on the second indication information.

Based on different second reference information, the following describes, in different cases, a method for turning on a laser headlight again.

Case A: The second reference information includes the second map information.

Herein, the second map information includes information about a third driving environment in front of the vehicle during driving. The information about the third driving environment indicates: a case in which no obstacle exists on a road segment in front of the vehicle, a case in which no pothole exists on the road segment in front of the vehicle, a case in which no construction area exists on the road segment in front of the vehicle, a case in which no wildlife presence area exists on the road segment in front of the vehicle, second risk information of the road segment in front of the vehicle, a case in which the road segment in front of the vehicle is not a gathering area of vulnerable road users, and a second weather condition (for example, weather is not bad) of the road segment in front of the vehicle.

Based on representation manners of risk information in Step 301, the second risk information may be, for example, a level-0 risk. In other words, when the second risk information is the level-0 risk, it indicates that the collision risk of the vehicle is eliminated. For another example, the second risk information may be “NO”. In other words, when the second risk information is “NO”, it indicates that the collision risk of the vehicle is eliminated. For still another example, the second risk information may be “0”. In other words, when the second risk information is “0”, it indicates that the collision risk of the vehicle is eliminated. For yet another example, the second risk information may be “low”. In other words, when the first risk information is “low”, it indicates that the collision risk of the vehicle is eliminated or reduced.

In a possible implementation, the in-vehicle controller may obtain the second map information from the server. For the possible implementation, refer to the description of FIG. 4. The first map information in FIG. 4 may be replaced by the second map information.

Figure 6:
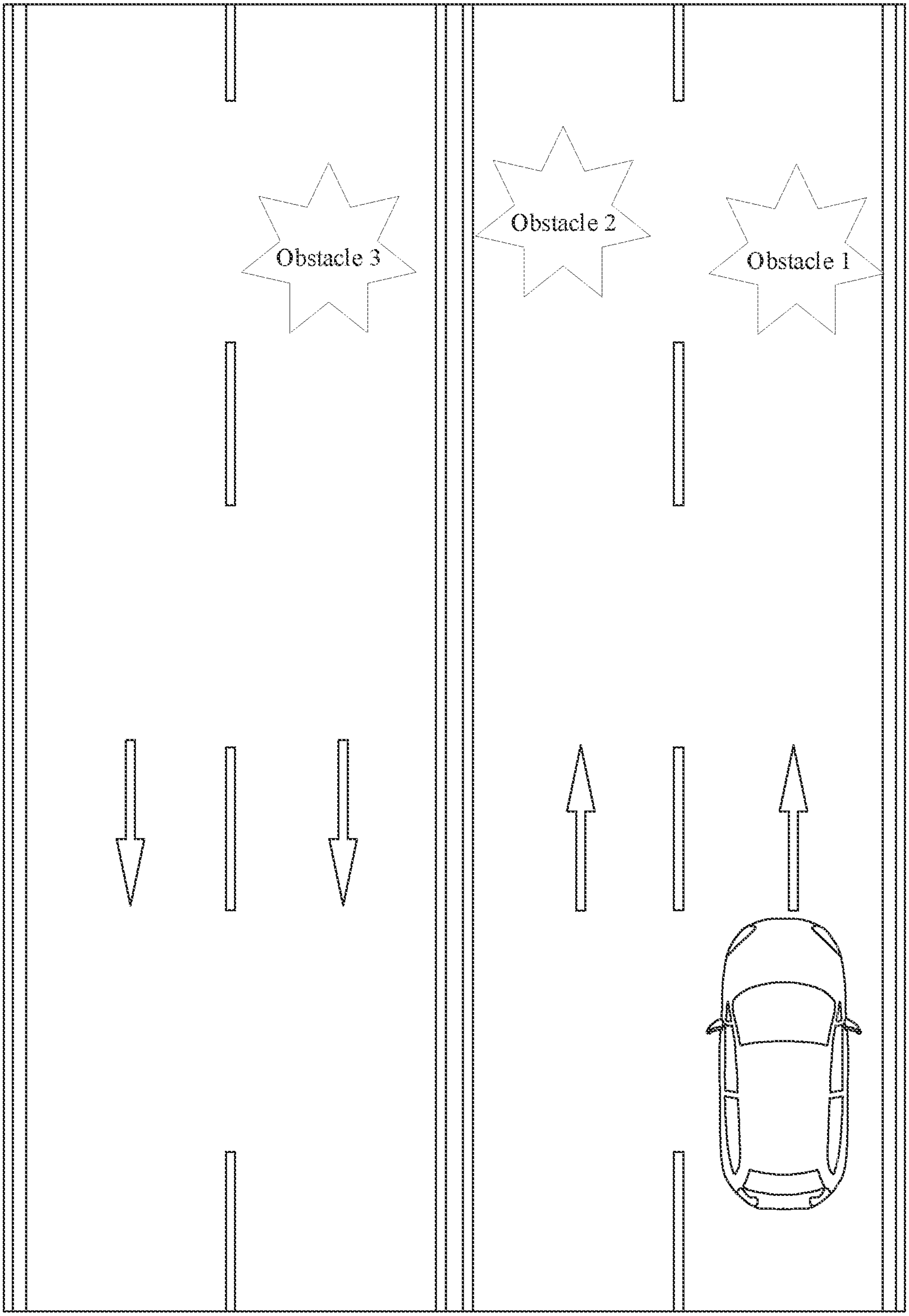
FIG. 6 is a schematic diagram depicting a location relationship between a vehicle and an obstacle according to this application.

Further, optionally, it may be determined, based on path planning of the vehicle, that the information about the third driving environment is information about a road segment to be passed by the vehicle; and it is determined, based on the information about the third driving environment, that the collision risk is eliminated. For example, the information about the third driving environment relates to an obstacle. If it is determined that no obstacle exists on the road segment to be passed by the vehicle, it indicates that the collision risk is eliminated. With reference to FIG. 6, that no obstacle exists on the road segment to be passed by the vehicle includes: the vehicle has bypassed the obstacle 1 and no new obstacle exists on the road segment in front of the vehicle.

Case B: The second parameter information includes the third information sensed by the roadside device.

Herein, the third information sensed by the roadside device includes information about a fourth driving environment in front of the vehicle during driving. The information about the fourth driving environment indicates: a case in which no obstacle exists on a road segment in front of the vehicle, a case in which no pothole exists on the road segment in front of the vehicle, a case in which no construction area exists on the road segment in front of the vehicle, a case in which no wildlife presence area exists on the road segment in front of the vehicle, second risk information of the road segment in front of the vehicle, a case in which the road segment in front of the vehicle is not a gathering area of vulnerable road users, and a second weather condition of the road segment in front of the vehicle.

In a possible implementation, the in-vehicle controller may obtain, from the roadside device, the third information sensed by the roadside device. For the possible implementation, refer to the description of FIG. 7. The first information sensed by the roadside device in FIG. 7 may be replaced by the third information sensed by the roadside device. Details are not described herein.

Further, optionally, it may be determined, based on the path planning of the vehicle, that the information about the fourth driving environment is information about the road segment to be passed by the vehicle; and it is determined, based on the information about the fourth driving environment, that the collision risk is eliminated. For example, the information about the fourth driving environment relates to an obstacle. If it is determined that no obstacle exists on the road segment to be passed by the vehicle, it indicates that the collision risk is eliminated. With reference to FIG. 6, that no obstacle exists on the road segment to be passed by the vehicle includes: the vehicle has bypassed the obstacle 1 and no another obstacle exists on the road segment in front of the vehicle.

Case C: The second reference information includes the fourth information sensed by the sensing device on the vehicle.

Case C-1: The fourth information sensed by the sensing device on the vehicle includes a second TTC.

In a possible implementation, a vehicle (such as the AEB system) in the vehicle may calculate the second TTC in real time based on the information sensed by the sensing device on the vehicle, and send the calculated second TTC to the in-vehicle controller. Correspondingly, the in-vehicle controller may receive the second TTC from the vehicle. If the second TTC does not meet the second preset condition, the in-vehicle controller determines that the collision risk of the vehicle is eliminated. For the second preset condition, refer to the foregoing related description.

It should be noted that, after obtaining the second TTC, the vehicle may directly send fourth indication information to the in-vehicle controller if it is determined that the TTC does not meet the first preset condition, where the fourth indication information indicates to turn on the laser headlight. Correspondingly, the in-vehicle controller may receive the fourth indication information from the vehicle, and control, based on the fourth indication information, to turn off the laser headlight.

Case C-2: The fourth information sensed by the sensing device on the vehicle includes a second kinetics parameter.

In a possible implementation, the ESC system in the vehicle may obtain the second kinetics parameter, and send the second kinetics parameter to the in-vehicle controller. Correspondingly, the in-vehicle controller may receive the second kinetics parameter from the ESC system. If the second kinetics parameter does not meet the second preset condition, the in-vehicle controller determines that the collision risk of the vehicle is eliminated.

Further, optionally, the second kinetics parameter includes but is not limited to a second transverse acceleration, a second longitudinal acceleration, a change rate of the second transverse acceleration, or a change rate of the second longitudinal acceleration.

Example 1: The Second Kinetics Parameter is a Second Longitudinal Deceleration

In a possible implementation, the in-vehicle controller may obtain the second longitudinal deceleration from the ESC system. If the second longitudinal deceleration is not greater than the second preset value, the in-vehicle controller may generate the second indication information that is used to turn on the laser headlight of the vehicle. For the second preset value, refer to the foregoing related descriptions. Details are not described herein.

It should be noted that, the ESC system obtains the second longitudinal deceleration and sends, if it is determined that the second longitudinal deceleration is not greater than the second preset value, the fourth indication information to the in-vehicle controller, where the fourth indication information indicates to turn on the laser headlight. Correspondingly, the in-vehicle controller may receive the fourth indication information from the ESC system, and may control, based on the fourth indication information, to turn on the laser headlight.

Example 2: The Second Kinetics Parameter is the Second Transverse Acceleration

In a possible implementation, the in-vehicle controller may obtain the second transverse acceleration from the ESC system. If the second transverse acceleration is not greater than the third preset value, the in-vehicle controller may generate the second indication information that is used to turn on the laser headlight of the vehicle. For the third preset value, refer to the foregoing related descriptions. Details are not described herein.

It should be noted that, the ESC system obtains the second transverse acceleration and may send, if it is determined that the second transverse acceleration is not greater than the third preset value, the fourth indication information to the in-vehicle controller, where the fourth indication information indicates to turn on the laser headlight. Correspondingly, the in-vehicle controller may receive the fourth indication information from the ESC system, and may control, based on the fourth indication information, to turn on the laser headlight.

Example 3: The Second Kinetics Parameter is a Change Rate of a Second Longitudinal Deceleration In a possible implementation, the in-vehicle controller may obtain the change rate of the second longitudinal deceleration from the ESC system. If the change rate of the second longitudinal deceleration is not greater than the fourth preset value, the in-vehicle controller may generate the second indication information that is used to turn on the laser headlight of the vehicle. For the fourth preset value, refer to the foregoing related descriptions. Details are not described herein.

It should be noted that, the ESC system obtains the change rate of the second longitudinal deceleration and may send, if the change rate of the second longitudinal deceleration is not greater than the fourth preset value, the fourth indication information to the in-vehicle controller, where the fourth indication information indicates to turn on the laser headlight. Correspondingly, the in-vehicle controller may receive the fourth indication information from the ESC system, and may control, based on the fourth indication information, to turn on the laser headlight.

Example 4: The Change Rate of the Second Transverse Acceleration is Used as an Example In a possible implementation, the in-vehicle controller may obtain the change rate of the second transverse acceleration from the ESC system. If the change rate of the second transverse acceleration is not greater than the fifth preset value, the in-vehicle controller generates the second indication information that is used to turn on the laser headlight of the vehicle. For example, the fifth preset value indicates that the change rate within 0.5 s is 5 $m/s^3$.

It should be noted that, the ESC system obtains the change rate of the second transverse acceleration and may send, if the change rate of the second transverse acceleration is not greater than the fifth preset value, the fourth indication information to the in-vehicle controller, where the fourth indication information indicates to turn on the laser headlight. Correspondingly, the in-vehicle controller may receive the fourth indication information from the ESC system, and may control, based on the fourth indication information, to turn on the laser headlight.

It should be noted that, if the in-vehicle controller obtains at least two of the second TTC, the second longitudinal deceleration, the second transverse acceleration, the change rate of the second longitudinal deceleration, and the change rate of the second transverse acceleration, the vehicle still has a collision risk, provided that one of the at least two of the second TTC, the second longitudinal deceleration, the second transverse acceleration, the change rate of the second longitudinal deceleration, and the change rate of the second transverse acceleration meets a corresponding preset condition.

Case D: The second reference information includes the second control information in the vehicle.

Case D-1: The second control information in the vehicle includes an inactive signal of a safety-type ADAS.

In a possible implementation, inactive signals of safety-type ADASs include but are not limited to an inactive signal of an AEB system, an inactive signal of an ESS system, an inactive signal of an AES system, and an inactive signal of an FCTA system.

In a possible implementation, when the inactive signal of the safety-type ADAS is received, it may be determined that the collision risk of the vehicle is eliminated. It should be understood that when the inactive signal of the safety-type ADAS is triggered, it indicates that the collision risk of the vehicle is eliminated.

It may be understood that, to implement the functions in the foregoing embodiment, a control apparatus includes corresponding hardware structures and/or software modules for performing the functions. A person skilled in the art should be easily aware that, with reference with modules and method steps in the examples described in embodiments disclosed in this application, this application can be implemented by hardware or a combination of hardware and computer software. Whether a function is performed through hardware or hardware driven by computer software depends on particular application scenarios and design constraint conditions of the technical solutions.

Figure 13:
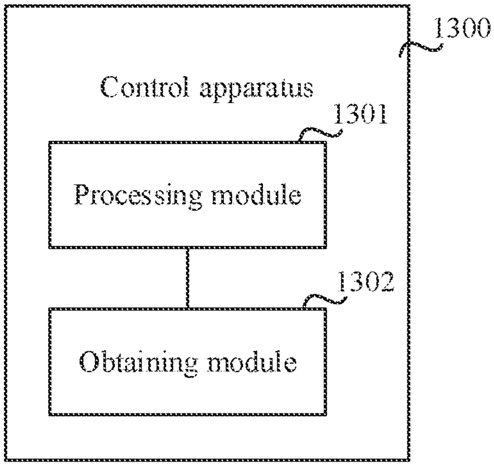
FIG. 13 is a schematic diagram depicting a structure of a control apparatus according to this application.
Figure 14:
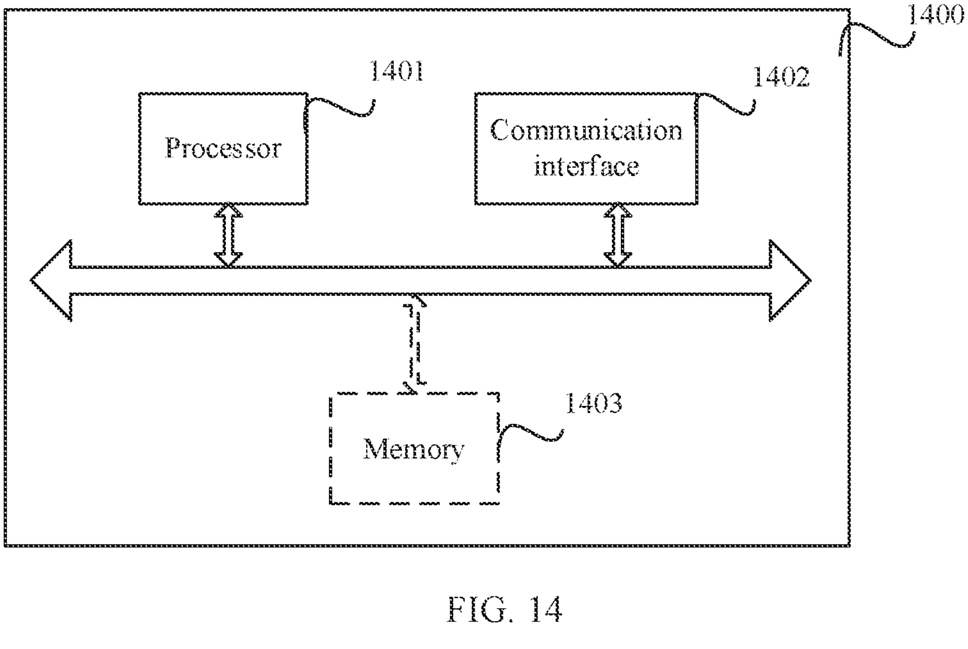
FIG. 14 is a schematic diagram depicting a structure of a control apparatus according to this application.

Based on the foregoing content and a same concept, FIG. 13 and FIG. 14 each are a schematic diagram depicting a structure of a control apparatus according to this application. The control apparatuses may be configured to implement a function of the in-vehicle controller, the server, or the roadside device in the foregoing method embodiment, and therefore can also achieve beneficial effects of the foregoing method embodiment. In this application, the control apparatus may be the domain controller shown in FIG. 2*a* in the vehicle; may be the ECU shown in FIG. 2*a* in the vehicle; may be the laser headlight controller shown in FIG. 2*b*; may be the vehicle, the server, or the roadside device shown in FIG. 2*d*; or may be a module (such as a chip) applied to the vehicle, the server, or the roadside device.

As shown in FIG. 13, a control apparatus 1300 includes a processing module 1301 and an obtaining module 1302. The control apparatus 1300 is configured to implement the method embodiment shown in FIG. 3, FIG. 4, FIG. 5, FIG. 7, FIG. 8, FIG. 9, FIG. 10, or FIG. 11.

When the control apparatus 1300 is configured to implement a function of an in-vehicle controller in the method embodiment shown in FIG. 3, the obtaining module 1302 is configured to obtain first reference information. The first reference information includes at least one of first map information, first information sensed by a roadside device, second information sensed by a sensing device on a vehicle, and first control information in the vehicle. The processing module 1301 is configured to determine, based on the first reference information, that the vehicle has a collision risk or that a collision occurs to the vehicle; and generate first indication information that is used to turn off a laser headlight of the vehicle.

For more detailed descriptions of the processing module 1301 and the obtaining module 1302, refer to related descriptions in the method embodiment shown in FIG. 3. Details are not described herein.

It should be understood that the processing module 1301 in this embodiment of this application may be implemented by a processor or a processor-related circuit component, and the obtaining module 1302 may be implemented by a transceiver or a transceiver-related circuit component.

Based on the foregoing content and a same concept, as shown in FIG. 14, this application further provides a control apparatus 1400. The control apparatus 1400 may include a processor 1401 and a communication interface 1402. The processor 1401 and the communication interface 1402 are coupled to each other. It may be understood that the communication interface 1402 may be an interface circuit or an input/output interface. Optionally, the control apparatus 1400 may further include a memory 1403. The memory is configured to store instructions executed by the processor 1401, input data used by the processor 1401 to execute instructions, or data generated after the processor 1401 executes instructions.

When the control apparatus 1400 is configured to implement the method shown in FIG. 3, the processor 1401 is configured to: perform a function of the processing module 1301, and perform a function of the obtaining module 1302 through the communication interface 1402.

Based on the foregoing same concept and content, this application further provides a vehicle. The vehicle may include the control apparatus in any one of the foregoing embodiments. Optionally, the vehicle may further include another component, such as a processor, a memory, a wireless communication apparatus, or a body of the vehicle.

In a possible implementation, the vehicle may be, for example, an unmanned vehicle, an intelligent vehicle, an electric vehicle, or a digital vehicle.

It may be understood that, the processor in this embodiment of this application may be a central processing unit (CPU), another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor or any regular processor.

The method steps in embodiments of this application may be implemented by hardware, or may be implemented by the processor executing software instructions. The software instructions may include a corresponding software module. The software module may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may be a component of the processor. The processor and the storage medium may be located in an ASIC. In addition, the ASIC may be located in the vehicle. Certainly, the processor and the storage medium may exist in the control apparatus as discrete components.

All or some of the foregoing embodiments may be implemented by using software, hardware, firmware, or any combination thereof. When software is used to implement the embodiments, all or some of the embodiments may be implemented in a form of a computer program product. The computer program product includes one or more computer programs or instructions. When the computer programs or the instructions are loaded and executed on a computer, all or some of the processes or functions in embodiments of this application are performed. The computer may be a general-purpose computer, a dedicated computer, a computer network, a network device, a user device, or another programmable apparatus. The computer programs or the instructions may be stored in a computer-readable storage medium or may be transmitted from a computer-readable storage medium to another computer-readable storage medium. For example, the computer programs or the instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium such as a floppy disk, a hard disk, or a magnetic tape, may be an optical medium such as a digital video disc (DVD), or may be a semiconductor medium such as a solid-state drive (SSD).

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

In this application, "at least one" means one or more, and "plurality" means two or more. "At least one of the following items (pieces)" or a similar expression thereof refers to any combination of these items, including a singular item (piece) or any combination of plural items (pieces). For example, at least one of a, b, or c may indicate a, b, c, "a and b", "a and c", "b and c", or "a, b, and c", where a, b, and c may be singular or plural. "And/or" describes an association relationship between associated objects, and represents that three relationships may exist. For example, A and/or B may represent the following cases: Only A exists, both A and B exist, and only B exists, where A and B may be singular or plural. In the text descriptions of this application, the character "/" generally indicates an "or" relationship between the associated objects. In a formula in this application, the character "/" indicates a "division" relationship between the associated objects. In addition, in this application, the word "example" is used to give an example, an illustration, or a description. Any embodiment or design scheme described as an "example" in this application should not be explained as being superior to or having more advantages than another embodiment or design scheme. Alternatively, it may be understood that the word "example" is used to present a concept in a specific manner, and does not constitute a limitation on this application.

It may be understood that various numbers in embodiments of this application are merely used for differentiation for ease of description, and are not used to limit the scope of embodiments of this application. The sequence numbers of the foregoing processes do not mean execution sequences, and the execution sequences of the processes should be determined based on functions and internal logic of the processes. The terms "first", "second", and another similar expression are intended to distinguish between similar objects but do not necessarily indicate a specific order or sequence. In addition, the terms "include", "have", and any variant thereof are intended to cover non-exclusive inclusion, for example, include a series of steps or modules. Methods, systems, products, or devices are not necessarily limited to those steps or modules that are clearly listed, but may include other steps or modules that are not clearly listed or that are inherent to such processes, methods, products, or devices.

It is clear that a person skilled in the art can make various modifications and variations to this application without departing from the scope of this application. This application is intended to cover these modifications and variations of this application provided that they fall within the scope of the following claims and their equivalent technologies.

What is claimed is:

1. An apparatus for controlling a laser headlight of a vehicle, comprising:

at least one processor; and one or more memories coupled to the at least one processor and storing programming instructions for execution by the at least one processor to:

obtain first reference information, wherein the first reference information comprises first map information and at least one of first information sensed by a roadside device, second information sensed by a sensing device on the vehicle, or first control information in the vehicle, and wherein the first map information comprises information about a first driving environment in front of the vehicle during driving;

determine, based on the first reference information, that the vehicle has a collision risk or that a collision occurs to the vehicle; and generate first indication information that is used to turn off the laser headlight of the vehicle;

wherein the first information sensed by the roadside device comprises information about a second driving environment in front of the vehicle during driving; and wherein the programming instructions are for execution by the at least one processor to at least one of:

determine, based on path planning of the vehicle, that the information about the first driving environment is information about a road segment to be passed by the vehicle; and determining, based on the information about the first driving environment, that the vehicle has the collision risk; or determine, based on the path planning of the vehicle, that the information about the second driving environment is information about the road segment to be passed by the vehicle; and determining, based on the information about the second driving environment, that the vehicle has the collision risk, wherein:

the information about the first driving environment and the information about the second driving environment each indicate at least one of:

a case in which an obstacle exists on the road segment in front of the vehicle;

a case in which a pothole exists on the road segment in front of the vehicle;

a case in which a construction area exists on the road segment in front of the vehicle;

a case in which a wildlife presence area exists on the road segment in front of the vehicle;

first risk information of the road segment in front of the vehicle;

a case in which the road segment in front of the vehicle is a gathering area of vulnerable road users; or a first weather condition of the road segment in front of the vehicle.

2. The apparatus according to claim 1, wherein the programming instructions are for execution by the at least one processor to:

obtain second reference information, wherein the second reference information comprises at least one of second map information, third information sensed by the roadside device, fourth information sensed by the sensing device on the vehicle, or second control information in the vehicle;

determine, based on the second reference information, that the collision risk is eliminated; and generate second indication information that is used to turn on the laser headlight.

3. The apparatus according to claim 2, wherein at least one of the second map information comprises information about a third driving environment in front of the vehicle during driving, or the third information sensed by the roadside device comprises information about a fourth driving environment in front of the vehicle during driving; and wherein the programming instructions are for execution by the at least one processor to at least one of:

determine, based on path planning of the vehicle, that the information about the third driving environment is information about a road segment to be passed by the vehicle; and determining, based on the information about the third driving environment, that the collision risk is eliminated; or determine, based on the path planning of the vehicle, that the information about the fourth driving environment is information about the road segment to be passed by the vehicle; and determining, based on the information about the fourth driving environment, that the collision risk is eliminated, wherein:

the information about the third driving environment and the information about the fourth driving environment each indicate at least one of:

a case in which no obstacle exists on the road segment in front of the vehicle;

a case in which no pothole exists on the road segment in front of the vehicle;

a case in which no construction area exists on the road segment in front of the vehicle;

a case in which no wildlife presence area exists on the road segment in front of the vehicle;

second risk information of the road segment in front of the vehicle;

a case in which the road segment in front of the vehicle is not a gathering area of vulnerable road users; or a second weather condition of the road segment in front of the vehicle.

4. The apparatus according to claim 1, wherein the second information sensed by the sensing device on the vehicle comprises a first time-to-collision (TTC); and wherein the programming instructions are for execution by the at least one processor to:

determine, based on a condition that the first TTC meets a first preset condition, that the vehicle has the collision risk.

5. The apparatus according to claim 4, wherein the programming instructions are for execution by the at least one processor to:

if the first TTC is less than a first preset value, determine that the vehicle has the collision risk.

6. The apparatus according to claim 2, wherein the third information sensed by the roadside device comprises a second time-to-collision (TTC); and wherein the programming instructions are for execution by the at least one processor to:

determine, based on a condition that the second TTC does not meet a first preset condition, that the collision risk is eliminated.

7. The apparatus according to claim 6, wherein the programming instructions are for execution by the at least one processor to:

if the second TTC is greater than or equal to a first preset value, determine that the collision risk is eliminated.

8. The apparatus according to claim 1, wherein the second information sensed by the sensing device on the vehicle comprises a first kinetics parameter; and wherein the programming instructions are for execution by the at least one processor to:

determine, based on a condition that the first kinetics parameter meets a second preset condition, that the vehicle has the collision risk.

9. The apparatus according to claim 8, wherein the first kinetics parameter comprises one of:

a first transverse acceleration, a first longitudinal acceleration, a change rate of the first transverse acceleration, or a change rate of the first longitudinal acceleration.

10. The apparatus according to claim 2, wherein the fourth information sensed by the sensing device on the vehicle comprises a second kinetics parameter; and wherein the programming instructions are for execution by the at least one processor to:

determine, based on a condition that the second kinetics parameter does not meet a second preset condition, that the collision risk is eliminated.

11. The apparatus according to claim 10, wherein the second kinetics parameter comprises one of:

a second transverse acceleration, a second longitudinal acceleration, a change rate of the second transverse acceleration, or a change rate of the second longitudinal acceleration.

12. The apparatus according to claim 1, wherein the first control information in the vehicle comprises an active signal of a safety-type advanced driver assistance system (ADAS); and wherein the programming instructions are for execution by the at least one processor to:

determine, based on the active signal of the safety-type ADAS, that the vehicle has the collision risk.

13. The apparatus according to claim 12, wherein the active signal of the safety-type ADAS comprises at least one of:

an active signal of an automatic emergency braking (AEB) system, an active signal of an emergency steering support (ESS) system, an active signal of an automatic emergency steering (AES) system, or an active signal of a front cross traffic alert (FCTA) system.

14. The apparatus according to claim 2, wherein the second control information in the vehicle comprises an inactive signal of a safety-type (ADAS); and wherein the programming instructions are for execution by the at least one processor to:

determine, based on the inactive signal of the safety-type ADAS, that the collision risk of the vehicle is eliminated.

15. The apparatus according to claim 14, wherein the inactive signal of the safety-type ADAS comprises at least one of:

an inactive signal of an automatic emergency braking (AEB) system, an inactive signal of an emergency steering support (ESS) system, an inactive signal of an automatic emergency steering (AES) system, or an inactive signal of a front cross traffic alert (FCTA) system.

16. The apparatus according to claim 1, wherein at least one of the second information sensed by the sensing device on the vehicle comprises collision indication information sensed by a collision sensor, or the first control information in the vehicle comprises information that is generated by an airbag controller and that is used to inflate an airbag; and wherein the programming instructions are for execution by the at least one processor to:

determine, based on at least one of the collision indication information or the information used to inflate the airbag, that the collision occurs to the vehicle.

17. The apparatus according to claim 1, wherein the apparatus is performed by the roadside device or a server, and the programming instructions are for execution by the at least one processor to:

send the first indication information to the vehicle.

18. The apparatus according to claim 1, wherein the apparatus is performed by the vehicle, and the programming instructions are for execution by the at least one processor to:

turn off the laser headlight based on the first indication information.

19. A method for controlling a laser headlight of a vehicle, comprising:

obtaining first reference information, wherein the first reference information comprises first map information and at least one of first information sensed by a roadside device, second information sensed by a sensing device on the vehicle, or first control information in the vehicle, and wherein the first map information comprises information about a first driving environment in front of the vehicle during driving;

determining, based on the first reference information, that the vehicle has a collision risk or that a collision occurs to the vehicle; and generating first indication information that is used to turn off the laser headlight of the vehicle;

wherein the first information sensed by the roadside device comprises information about a second driving environment in front of the vehicle during driving; and wherein the method comprises at least one of:

determine, based on path planning of the vehicle, that the information about the first driving environment is information about a road segment to be passed by the vehicle; and determining, based on the information about the first driving environment, that the vehicle has the collision risk; or determine, based on the path planning of the vehicle, that the information about the second driving environment is information about the road segment to be passed by the vehicle; and determining, based on the information about the second driving environment, that the vehicle has the collision risk;

wherein the information about the first driving environment and the information about the second driving environment each indicate at least one of:

a case in which an obstacle exists on the road segment in front of the vehicle;

a case in which a pothole exists on the road segment in front of the vehicle;

a case in which a construction area exists on the road segment in front of the vehicle;

a case in which a wildlife presence area exists on the road segment in front of the vehicle;

first risk information of the road segment in front of the vehicle;

a case in which the road segment in front of the vehicle is a gathering area of vulnerable road users; or a first weather condition of the road segment in front of the vehicle.

20. The method according to claim 19, further comprising:

obtaining second reference information, wherein the second reference information comprises at least one of second map information, third information sensed by the roadside device, fourth information sensed by the sensing device on the vehicle, or second control information in the vehicle;

determining, based on the second reference information, that the collision risk is eliminated; and generating second indication information that is used to turn on the laser headlight.

* * * * *